US009261274B2

United States Patent
Jiang et al.

(10) Patent No.: US 9,261,274 B2
(45) Date of Patent: Feb. 16, 2016

(54) SUPPLEMENTAL FUEL TO COMBUSTOR OF DUAL FLUIDIZED BED GASIFIER

(71) Applicants: Weibin Jiang, Aurora, CO (US); Bruce E. McComish, Mitchell, SD (US); Bryan C. Borum, Commerce City, CO (US); Benjamin H. Carryer, Dubuque, IA (US); Mark D. Ibsen, Highlands Ranch, CO (US); Mark K. Robertson, Denver, CO (US); Eric R. Elrod, Arvada, CO (US); Sim Weeks, Duluth, GA (US); Harold A. Wright, Longmont, CO (US)

(72) Inventors: Weibin Jiang, Aurora, CO (US); Bruce E. McComish, Mitchell, SD (US); Bryan C. Borum, Commerce City, CO (US); Benjamin H. Carryer, Dubuque, IA (US); Mark D. Ibsen, Highlands Ranch, CO (US); Mark K. Robertson, Denver, CO (US); Eric R. Elrod, Arvada, CO (US); Sim Weeks, Duluth, GA (US); Harold A. Wright, Longmont, CO (US)

(73) Assignee: RES USA, LLC, Commerce City, CO (US)

(*) Notice: Subject to any disclaimer, the term of this patent is extended or adjusted under 35 U.S.C. 154(b) by 0 days.

(21) Appl. No.: 13/661,815

(22) Filed: Oct. 26, 2012

(65) Prior Publication Data
US 2013/0161563 A1    Jun. 27, 2013

Related U.S. Application Data

(60) Provisional application No. 61/578,754, filed on Dec. 21, 2011.

(51) Int. Cl.
*C01B 3/24* (2006.01)
*F23C 10/00* (2006.01)
(Continued)

(52) U.S. Cl.
CPC ............... *F23C 10/005* (2013.01); *C01B 3/50* (2013.01); *C10B 49/22* (2013.01); *C10G 2/32* (2013.01);
(Continued)

(58) Field of Classification Search
CPC ........................................................ C01B 3/50
USPC ........................................................ 423/650
See application file for complete search history.

(56) References Cited

U.S. PATENT DOCUMENTS 3,888,632 A * 6/1975 Fritz et al. .................. 422/176
3,926,582 A * 12/1975 Powell et al. ................ 48/62 R
(Continued)

FOREIGN PATENT DOCUMENTS

| WO | 02099918 | 12/2002 |
| WO | 2009049063 | 4/2009 |
| WO | 2010048493 | 4/2010 |

OTHER PUBLICATIONS

Jiang et al., U.S. Appl. No. 61/551,582, filed Oct. 26, 2011 for corresponding U.S. Application (73 pgs.).
(Continued)

*Primary Examiner* — Paul Wartalowicz
(74) *Attorney, Agent, or Firm* — Timothy S. Westby; Porter Hedges LLP

(57) ABSTRACT

A method of gasification by introducing a feed material to be subjected to gasification into a dual fluidized bed gasifier comprising a pyrolyzer fluidly connected with a combustor such that a circulation stream comprising a heat transfer material can be continuously circulated between the pyrolyzer, in which the temperature of the circulation stream is reduced, and the combustor, in which the temperature of the circulation stream is increased, wherein the pyrolyzer is operable to convert at least a portion of the feed material into a gasifier product gas comprising hydrogen and carbon monoxide, and wherein the combustor is operable to increase the temperature of the circulation stream via combustion of char introduced thereto with the circulation stream and at least one supplemental fuel. A system for carrying out the method is also provided.

58 Claims, 2 Drawing Sheets

(51) Int. Cl.

| | |
|---|---|
| *C01B 3/50* | (2006.01) |
| *C10K 1/00* | (2006.01) |
| *C10K 1/08* | (2006.01) |
| *C10K 1/32* | (2006.01) |
| *C10G 2/00* | (2006.01) |
| *C10J 3/48* | (2006.01) |
| *C10J 3/50* | (2006.01) |
| *C10K 3/00* | (2006.01) |
| *C10B 49/22* | (2006.01) |

(52) U.S. Cl.
CPC .... *C10J 3/48* (2013.01); *C10J 3/50* (2013.01); *C10K 1/002* (2013.01); *C10K 1/08* (2013.01); *C10K 1/32* (2013.01); *C10K 3/005* (2013.01); *C01B 2203/048* (2013.01); *C01B 2203/0495* (2013.01); *C01B 2203/062* (2013.01); *C10J 2300/093* (2013.01); *C10J 2300/0909* (2013.01); *C10J 2300/0993* (2013.01); *C10J 2300/1637* (2013.01); *C10J 2300/1659* (2013.01); *C10J 2300/1807* (2013.01); *Y02E 20/18* (2013.01); *Y02E 50/32* (2013.01)

(56) References Cited

U.S. PATENT DOCUMENTS

| | | | | |
|---|---|---|---|---|
| 4,244,706 | A | * | 1/1981 | Forney et al. ............... 48/202 |
| 4,678,860 | A | * | 7/1987 | Kuester ....................... 585/14 |
| 4,767,313 | A | * | 8/1988 | Lockwood, Jr. ............. 431/1 |
| 4,828,581 | A | | 5/1989 | Feldmann et al. |
| 5,032,252 | A | | 7/1991 | Owen et al. |
| 5,508,118 | A | | 4/1996 | Hayashi et al. |
| 5,763,716 | A | * | 6/1998 | Benham et al. ............. 585/315 |
| 5,954,000 | A | | 9/1999 | Panos |
| 6,042,795 | A | | 3/2000 | Chen et al. .................. 423/210 |
| 6,476,161 | B1 | * | 11/2002 | Harlin et al. ................ 526/65 |
| 7,037,485 | B1 | * | 5/2006 | Drnevich et al. ............ 423/652 |
| 7,214,252 | B1 | * | 5/2007 | Krumm et al. ............... 48/198.2 |
| 7,579,756 | B2 | | 8/2009 | Althoff et al. |
| 7,763,088 | B2 | | 7/2010 | Feldmann et al. |
| 8,241,523 | B2 | | 8/2012 | Apanel |
| 2002/0046655 | A1 | * | 4/2002 | Hsu et al. .................... 95/273 |
| 2002/0134019 | A1 | * | 9/2002 | Paisley ........................ 48/197 R |
| 2003/0150365 | A1 | | 8/2003 | Durant et al. |
| 2007/0217995 | A1 | * | 9/2007 | Matsumura et al. ......... 423/657 |
| 2008/0116052 | A1 | * | 5/2008 | Eatough et al. .............. 201/6 |
| 2008/0173533 | A1 | * | 7/2008 | Mankins et al. ............. 204/157.15 |
| 2008/0197012 | A1 | * | 8/2008 | Berruti et al. ................ 201/31 |
| 2009/0062108 | A1 | | 3/2009 | Demirel et al. |
| 2009/0075814 | A1 | | 3/2009 | Duvenhage et al. |
| 2009/0188165 | A1 | | 7/2009 | Ariyapadi et al. |
| 2009/0298678 | A1 | | 12/2009 | Demirel et al. |
| 2010/0166913 | A1 | * | 7/2010 | Stewart ........................ 426/54 |
| 2010/0181539 | A1 | * | 7/2010 | Apanel et al. ................ 252/373 |
| 2010/0237290 | A1 | * | 9/2010 | Rolland et al. ............... 252/373 |
| 2010/0311570 | A1 | | 12/2010 | Duvenhage et al. |
| 2011/0168605 | A1 | * | 7/2011 | Blevins et al. ................ 208/85 |
| 2011/0178185 | A1 | | 7/2011 | Blevins et al. |
| 2012/0090353 | A1 | * | 4/2012 | Chen ............................ 62/617 |
| 2013/0065974 | A1 | * | 3/2013 | Kresnyak ..................... 518/702 |

OTHER PUBLICATIONS

Search Report and Written Opinion dated Feb. 20, 2013 for corresponding International Application No. PCT/US2012/062077 (8 pgs.).

Office Action dated Jun. 19, 2014 for corresponding U.S. Appl. No. 14/048,989 (36 pgs.).

International Preliminary Report on Patentability dated Jun. 24, 2014 for corresponding International Application No. PCT/US2012/062077 (7 pgs.).

Office Action dated Dec. 22, 2014 for corresponding U.S. Appl. No. 14/048,989 (54 pgs.).

Office Action dated Apr. 9, 2015 for corresponding U.S. Appl. No. 14/048,989 (134 pgs.).

* cited by examiner

SUPPLEMENTAL FUEL TO COMBUSTOR OF DUAL FLUIDIZED BED GASIFIER

CROSS-REFERENCE TO RELATED APPLICATIONS

This application claims the benefit under 35 U.S.C. §119(e) of U.S. Provisional Patent Application No. 61/578,754, filed Dec. 21, 2011, the disclosure of which is hereby incorporated herein by reference.

STATEMENT REGARDING FEDERALLY SPONSORED RESEARCH OR DEVELOPMENT

Not applicable.

BACKGROUND

1. Field of the Invention

This disclosure relates generally to the field of gasification. More specifically, the disclosure relates to a system and method for the production of synthesis gas via gasification of carbonaceous materials. Still more specifically, the disclosed system and method are suitable for the production of synthesis gas for use in the Fischer-Tropsch synthesis of hydrocarbons, the production of power, the production of non-Fischer-Tropsch chemicals/fuels or a combination thereof.

2. Background of Invention

Gasification is utilized to produce process gas suitable for the production of various chemicals, for the production of Fischer-Tropsch liquid hydrocarbons, and for the production of power. Many feed materials may serve as carbonaceous sources for gasification, including, for example, shredded bark, wood chips, sawdust, sludges (e.g., sewage sludge), municipal solid waste (MSW), refuse derived fuel (RDF), and a variety of other carbonaceous materials.

Fischer-Tropsch (FT) synthesis represents a catalytic method for the creation of synthetic waxes, liquids, fuels and gases. The reaction occurs by the metal catalysis of an exothermic reaction between carbon monoxide and hydrogen gas in mixtures known as synthesis gas, or 'syngas'. The liquid product of the reaction is typically refined to produce a range of synthetic fuels, lubricants and waxes. The primary metals utilized as catalysts are ruthenium, cobalt and iron. Providing synthesis gas having a desired molar ratio of hydrogen to carbon monoxide is necessary for economic production of Fischer-Tropsch synthesis products.

There is a need in the art for improved systems and methods of gasification, whereby materials (that may be generally considered waste) may be converted to and/or utilized to produce a gas suitable for the production of power and/or for the production of various chemicals and/or fuels (including, without limitation, Fischer-Tropsch synthesis products).

SUMMARY

Herein disclosed is a method of gasification, the method comprising introducing a feed material to be subjected to gasification into a dual fluidized bed gasifier comprising a pyrolyzer fluidly connected with a combustor such that a circulation stream comprising a heat transfer material can be continuously circulated between the pyrolyzer, in which the temperature of the circulation stream is reduced, and the combustor, in which the temperature of the circulation stream is increased, wherein the pyrolyzer is operable to convert at least a portion of the feed material into a gasifier product gas comprising hydrogen and carbon monoxide, and wherein the combustor is operable to increase the temperature of the circulation stream via combustion of char introduced thereto with the circulation stream and at least one supplemental fuel. In embodiments, the at least one supplemental fuel comprises at least one component selected from the group consisting of methane, Fischer-Tropsch tailgas, PSA tailgas, VSA tailgas, product upgrader tailgas, spent Fischer-Tropsch catalyst, tar, volatile organic compounds (VOC's), animal fats, petroleum oils, synthesis gas, petcoke, biomass, Fischer-Tropsch product, and combinations thereof. In embodiments, the at least one supplemental fuel is introduced into the combustor separately from the circulation stream. In embodiments, the at least one supplemental fuel is introduced directly into the combustor. In embodiments, the at least one supplemental fuel is combined with the circulation stream prior to introduction into the combustor. In embodiments, the at least one supplemental fuel is combined with the circulation stream upstream of the pyrolyzer. In embodiments, the at least one supplemental fuel is introduced into the pyrolyzer.

In embodiments, the method comprises producing at least one supplemental fuel upstream of the dual fluidized bed gasifier. The at least one supplemental fuel may comprise a dryer vent gas stream comprising volatile organic compounds (VOC's). In embodiments, the method further comprises scrubbing volatile organic compounds from a dryer vent gas, and utilizing a VOC-reduced dryer vent gas from the scrubber as supplemental fuel. In embodiments, the method comprises drying at least a portion of the feed material to reduce the moisture content prior to introduction thereof into the pyrolyzer, wherein drying produces a dryer vent gas comprising VOC's, and utilizing at least a portion of the dryer vent gas as supplemental fuel for combustion. In embodiments, drying comprises utilizing at least a portion of the heat from a flue gas produced in the combustor to dry the feed material.

In embodiments, the method comprises producing at least one supplemental fuel downstream from the dual fluidized bed gasifier. The method may comprise subjecting at least a portion of the gasifier product gas to tar removal, and utilizing at least a portion of the removed tar as a supplemental fuel to the combustor. Subjecting at least a portion of the gasifier product gas to tar removal may comprise scrubbing tar from the gasifier product gas with an absorption liquid, to provide a tar-reduced product gas and a spent scrubbing liquid comprising tar, and utilizing at least a portion of the spent scrubbing liquid as supplemental fuel to the combustor. In embodiments, the method comprises introducing at least a portion of the spent scrubbing liquid to the pyrolyzer to produce additional synthesis gas therefrom. The absorption liquid may be aqueous or oil-based.

In embodiments, the method comprises utilizing at least a portion of the gasifier product gas to produce power, utilizing at least a portion of the gasifier product gas in a catalytic operation downstream of the dual fluidized bed gasifier, or both. In embodiments, the method comprises subjecting at least a portion of the gasifier product gas to Fischer-Tropsch synthesis, thus producing Fischer-Tropsch hydrocarbons and a Fischer-Tropsch tailgas. In embodiments, the method comprises utilizing at least a portion of the Fischer-Tropsch tailgas as supplemental fuel. In embodiments, the method comprises utilizing at least a portion of the Fischer-Tropsch tailgas as feed material. In embodiments, the method comprises separating a spent catalyst material comprising Fischer-Tropsch catalyst and Fischer-Tropsch hydrocarbon products, and introducing at least a portion of the spent catalyst material to the dual fluidized bed gasifier. At least a portion of the spent catalyst material may be utilized as the at least one supplemental fuel for the combustor. At least a portion of the spent catalyst material may be utilized as feed material for the pyrolyzer.

In embodiments, the method comprises subjecting at least a portion of the Fischer-Tropsch hydrocarbons to product upgrading, wherein product upgrading produces a product upgrading tailgas, and introducing at least a portion of the product upgrading tailgas to the dual fluidized bed gasifier. At least a portion of the product upgrading tailgas may be introduced as supplemental fuel for the combustor. At least a portion of the product upgrading tailgas may be introduced as feed material for the pyrolyzer.

In embodiments, the gasifier product gas comprises a molar ratio of hydrogen to carbon monoxide and the method further comprises obtaining a desired molar ratio by adjusting the amount of the at least one supplemental fuel. The method may comprise adjusting the amount of the at least one supplemental fuel to alter the amount of methane in the gasifier product gas. The method may comprise reducing the amount of tar in the gasifier product gas by increasing the temperature of the circulation stream introduced into the pyrolyzer by increasing the amount of the at least one supplemental fuel introduced into the combustor. In embodiments, the method comprises no dedicated tar removal step downstream of the dual fluidized bed gasifier and prior to utilization of at least a portion of the gasifier product gas for the production of at least one product selected from the group consisting of power, Fischer-Tropsch hydrocarbons, and non-Fischer-Tropsch chemicals.

In embodiments, the method comprises performing vacuum swing adsorption (VSA), pressure swing adsorption (PSA), or both, thus producing at least one tailgas selected from the group consisting of a VSA tailgas and a PSA tailgas, and introducing at least a portion of the at least one tailgas to the dual fluidized bed gasifier. At least a portion of the at least one tailgas may be introduced as the at least one supplemental fuel for the combustor. At least a portion of the at least one tailgas may be introduced as feed material for the pyrolyzer.

In embodiments, the method comprises producing, downstream of the dual fluidized bed gasifier, at least one product selected from the group consisting of Fischer-Tropsch hydrocarbons, power, and non-Fischer-Tropsch chemicals from at least a portion of the gasifier product gas. In embodiments, the method comprises utilizing at least a portion of a hydrocarbon-containing fluid produced downstream of the dual fluidized bed gasifier as the at least one supplemental fuel for the combustion.

The at least one supplemental fuel may be primarily liquid, primarily solid, or primarily gaseous. In embodiments, the at least one supplemental fuel comprises primarily a low pressure gas. In embodiments, the at least one supplemental fuel is primarily liquid, and the method comprises introducing the at least one supplemental fuel into the combustor without directly contacting the refractory thereof with the at least one supplemental fuel prior to combination thereof with the contents of the combustor.

In embodiments, the method comprises operating the gasifier at a lower pressure during turndown, such that the velocity of the gasifier product gas exiting the pyrolyzer is substantially constant during turndown and production.

Also disclosed herein is a dual fluidized bed gasification system comprising: a dual fluidized bed gasifier comprising a pyrolyzer and a combustor fluidly connected such that a circulation stream comprising a heat transfer material can be continuously circulated therebetween, wherein the combustor is a fluidized bed combustor configured for heating a particulate heat transfer material via combustion of char introduced with the circulation stream and at least one supplemental fuel, thus producing a combustor flue gas; and wherein the pyrolyzer is a fluidized bed pyrolyzer configured to receive the heated particulate heat transfer material and a carbonaceous feedstock, whereby the heated particulate heat transfer material provides heat for endothermic gasification of the carbonaceous feedstock, thus producing a gasifier product gas comprising hydrogen and carbon monoxide. The system may comprise a dryer configured to reduce the moisture content of the carbonaceous feedstock, thus producing a dryer vent gas comprising volatile organic compounds (VOC's), and a pathway fluidly connecting the dryer with the dual fluidized bed gasifier, whereby at least a portion of the dryer vent gas may be introduced into the dual fluidized bed gasifier. In embodiments, the pathway fluidly connects the dryer with the combustor, whereby at least a portion of the dryer vent gas can be utilized as supplemental fuel for combustion. In embodiments, the pathway fluidly connects the dryer with the pyrolyzer, whereby at least a portion of the dryer vent gas can be utilized as carbonaceous feedstock. In embodiments, the dryer is configured to utilize at least a portion of the heat of the combustor flue gas to dry the carbonaceous feedstock. In embodiments, the pathway traverses a scrubber configured to scrub VOC's from the dryer vent gas, thus producing a spent scrubbing liquid comprising scrubbed VOC's and a gas stream comprising a reduced amount of VOC's relative to the dryer vent gas.

The system may comprise a tar removal apparatus downstream of the dual fluidized bed gasifier. The system may comprise a recycle line configured for introducing at least a portion of the tar removed via the tar removal apparatus into the dual fluidized bed gasifier. The recycle line may be configured to introduce at least a portion of the tar removed via the tar removal apparatus into the combustor for use as supplemental fuel. In embodiments, the tar removal apparatus is configured to contact at least a portion of the gasifier product gas with a scrubbing liquid, thus producing a spent scrubbing liquid comprising tars, and at least a portion of the spent scrubbing liquid is utilized as supplemental fuel for combustion. In embodiments, the system comprises Fischer-Tropsch synthesis apparatus, power production apparatus, or both downstream of tar removal apparatus.

In embodiments, the system comprises Fischer-Tropsch synthesis apparatus configured to convert at least a portion of the gasifier product gas into Fischer-Tropsch hydrocarbons. In embodiments, the Fischer-Tropsch synthesis apparatus is configured to provide a Fischer-Tropsch tailgas, a spent catalyst material comprising Fischer-Tropsch catalyst and hydrocarbons, or both a Fischer-Tropsch tailgas and a spent catalyst material, and the system comprises one or more recycle lines configured to return at least a portion of the Fischer-Tropsch tailgas, at least a portion of the spent catalyst material, or at least a portion of both the Fischer-Tropsch tailgas and the spent catalyst material to the dual fluidized bed gasifier. In embodiments, the system comprises one or more recycle lines configured to introduce at least a portion of the Fischer-Tropsch tailgas for use as supplemental fuel for the combustor, for use as carbonaceous feedstock for the pyrolyzer, or both. In embodiments, the system comprises one or more recycle lines configured to introduce at least a portion of the spent catalyst material for use as supplemental fuel for the combustor, for use as carbonaceous feedstock for the pyrolyzer, or both.

The system may comprise product upgrading apparatus configured to upgrade the Fischer-Tropsch hydrocarbons, thus producing upgraded Fischer-Tropsch products and a product upgrader tailgas. The system may comprise a recycle line configured to introduce at least a portion of the product upgrader tailgas into the dual fluidized bed gasifier. The recycle line may be configured to introduce the at least a portion of the product upgrader tailgas as supplemental fuel for the combustor. The recycle line may be configured to introduce the at least a portion of the product upgrader tailgas as carbonaceous feedstock for the pyrolyzer.

In embodiments, the system comprises a pressure swing adsorber (PSA), a vacuum swing adsorber (VSA), or both; and one or more recycle lines configured to introduce at least a portion of a tailgas produced in the PSA, the VSA, or both, into the dual fluidized bed gasifier. The system may comprise at least one recycle line configured to introduce the at least a portion of the tailgas as supplemental fuel for the combustor. The system may comprise at least one recycle line configured to introduce the at least a portion of the tailgas as carbonaceous feedstock for the pyrolyzer.

The system may be configured for combination of the at least one supplemental fuel with the circulating heat transfer material prior to introduction into the combustor. The system may comprise at least one component selected from the group consisting of gas turbines and catalytic reactors downstream of the dual fluidized bed gasifier. In embodiments, the dual fluidized bed gasifier is operable to produce a gasifier product gas comprising a level of tar low enough to enable operation in the absence of a dedicated tar removal apparatus. In embodiments, the system is operable to produce a gasifier product gas having a molar ratio of hydrogen to carbon monoxide suitable for production of Fischer-Tropsch synthesis products therefrom via an iron-based catalyst. In embodiments, the system is operable to produce a gasifier product gas having a molar ratio of hydrogen to carbon monoxide suitable for production of Fischer-Tropsch synthesis products therefrom via a cobalt-based catalyst.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings, wherein like numbers indicate like parts unless otherwise apparent, and wherein.

NOTATION AND NOMENCLATURE

Figure 1:
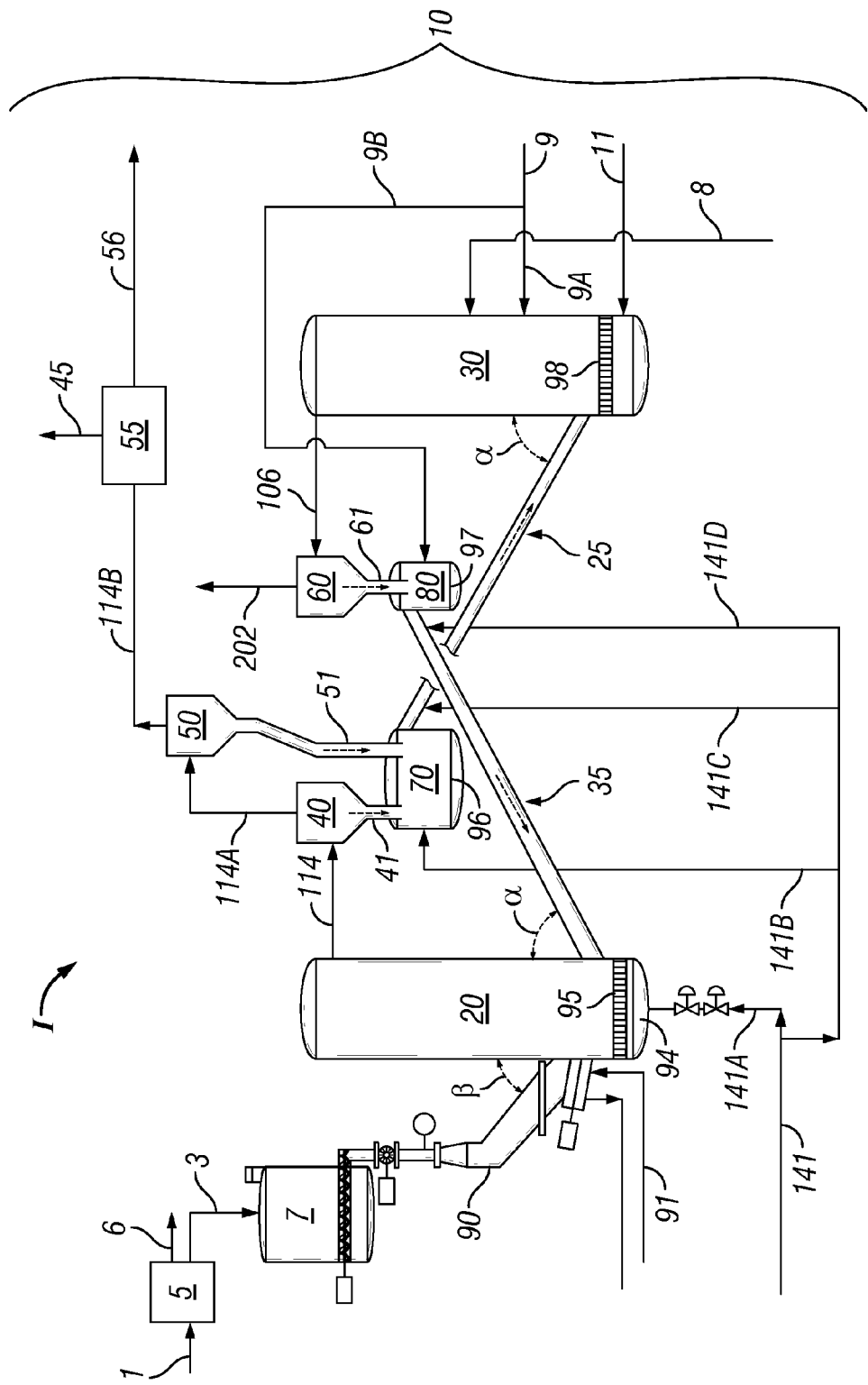
FIG. 1 is schematic of a gasification system according to this disclosure.

Certain terms are used throughout the following description and claims to refer to particular system components. This document does not intend to distinguish between components that differ in name but not function.

The terms 'pyrolyzer' and 'gasifier' are used interchangeably herein to refer to a reactor configured for endothermal pyrolysis.

DETAILED DESCRIPTION

Overall Dual Fluidized Bed (DFB) System

Herein disclosed are a dual fluidized bed gasification system, and methods of gasification using same. The disclosed system and method incorporate the use of supplemental fuels to a combustor of a dual fluidized bed gasifier, as discussed in detail hereinbelow. The gasification system thus comprises a dual fluidized bed gasifier, and may also comprise at least one downstream or upstream apparatus from which a hydrocarbon-containing stream is produced, which hydrocarbon-containing stream is utilizable as supplemental fuel (as supplement to the char carried over with the heat transfer material, as discussed hereinbelow) in the combustor of the dual fluidized bed gasifier. The supplemental fuel may be preheated upstream of the combustor. The utilization of supplemental fuel in the combustor allows for control of the temperature of the DFB gasifier. Increasing the operating temperature of the DFB gasifier may allow for the reforming of tars within the DFB gasifier, thus reducing the amount of tars, such as but not limited to phenolics and naphthalenes, in the product synthesis gas. Such a reduction of the tars in the product synthesis gas may reduce or eliminate the requirement for additional synthesis gas conditioning prior to subsequent use. The use of supplemental fuel to the combustor of the DFB gasifier may alternatively or additionally allow for control of the molar ratio (i.e. an increase thereof) of hydrogen to carbon monoxide in the product synthesis gas. Such control of the molar ratio of hydrogen to carbon monoxide may be useful, for example, when the DFB gasifier is to be utilized to provide synthesis gas suitable for downstream production of Fischer-Tropsch liquids. Utilization of supplemental fuel may be used to control the temperature of the DFB gasification such that the product synthesis gas has a suitable molar $H_2:CO$ ratio for a desired Fischer-Tropsch catalyst. That is, different Fischer-Tropsch catalysts (i.e. iron-based, ruthenium-based, or cobalt-based) operate best with certain molar ratios of hydrogen to carbon monoxide. The disclosed system and method, which incorporate temperature control of gasification via the use of supplemental fuel to the combustor of a DFB gasifier, may thus be utilized to provide an appropriate synthesis gas for a desired downstream application. Utilization of supplemental fuel may be operable to reduce the amount of an undesired product (such as methane and/or tars) in the gasifier product gas.

The downstream apparatus from which the supplemental fuel may be produced may be configured for the production of chemicals, fuels, and/or power from the gas produced in the dual fluidized bed gasifier. The dual fluidized bed gasifier comprises a combustor and a pyrolyzer, as discussed in detail hereinbelow, and may further comprise one or more combustor seal pots, gasifier seal pots, 'J'-seals/valves, 'L'-seals/valves, primary gasifier separators (e.g., heat transfer material, HTM, cyclone(s)), secondary gasifier separators (e.g., ash cyclone(s)), and/or combustor separators (e.g., primary and/or secondary cyclone(s)), described in more detail hereinbelow.

The disclosed method comprises introducing inlet gas at a low gas velocity to fluidize a high average density bed in a gasifier/pyrolysis vessel. The high average density bed may comprise a relatively dense fluidized bed in a lower region thereof, the relatively dense fluidized bed containing a circulating heated relatively fine and inert particulate heat transfer material. Carbonaceous material is introduced into the lower region at a relatively high rate, and endothermal pyrolysis of the carbonaceous material is accomplished by means of a circulating, heated, inert material, producing a gasifier product gas comprising synthesis gas (i.e. comprising hydrogen and carbon monoxide). The product gas may further comprise one or more component selected from methane, tars, carbon dioxide, and $H_2O$. In embodiments, in an upper region of the pyrolyzer is a lower average density entrained space region containing an entrained mixture comprising inert solid, particulate heat transfer material, char, unreacted carbonaceous material, and product gas. The entrained mixture is removed from the gasifier to one or more separators, such as a cyclone(s), wherein solids (heat transfer particles, char and/or unreacted carbonaceous material) are separated from the gasification product gas. At least a portion of the removed solids is returned to the pyrolyzer after reheating to a desired temperature via passage through an exothermic reaction zone of an external combustor.

FIG. 1 is a schematic of a dual fluidized bed (or 'DM') gasification system I according to this disclosure. DFB gasification system I comprises a dual fluidized bed gasifier 10, upstream process 5 and downstream process 55. According to embodiments of this disclosure, one or more hydrocarbon containing streams produced via upstream processing unit(s) 5 and/or downstream processing unit(s) 55 can be utilized as supplemental fuel to the combustor 30 of the dual fluidized bed gasifier 10. In embodiments, the supplemental fuel to the combustor is from an outside fuel source. In embodiments, for example, biomass is added to the combustor.

Dual fluidized bed gasifier 10 comprises gasifier 20 (also referred to herein as a 'pyrolyzer') that is fluidly connected with a combustor 30 via heat transfer line 25 (whereby relatively 'cool' heat transfer material is transferred from the gasifier to the combustor) and heat transfer line 35 (whereby relatively 'hot' heat transfer material is transferred from the combustor back to the gasifier), whereby heat lost during endothermic gasification in gasifier/pyrolyzer 20 can be supplied via exothermic combustion in combustor 30, as discussed further hereinbelow. DFB gasifier 10 may further comprise at least one combustor seal pot 70 and/or at least one gasifier seal pot 80. Pyrolyzer 20 is operable for removal therefrom of a circulating particulate phase and char by entrainment in gasifier product gas. Separation of solid, entrained particulates comprising particulate heat transfer material (HTM) and char from the gasification product gas, can be accomplished by gas/solid separators, such as conventional cyclone(s). In embodiments, substantially all system solids are elutriated by the herein disclosed method despite the use of what are generally considered to be low inlet gasifier fluidization gas velocities. DFB gasifier 10 thus further comprises one or more gasifier particulate separator (e.g., one or more gasifier cyclones) and/or one or more combustor particulate separator (e.g., one or more combustor cyclones). In the embodiment of FIG. 1, DFB gasifier 10 comprises primary gasifier cyclones 40, secondary gasifier cyclones 50 and combustor cyclones 60. Each of these components will be discussed in more detail hereinbelow.

Circulating between the gasifier and the combustor is a heat transfer material (HTM). The heat transfer material is relatively inert compared to the carbonaceous feed material being gasified. In embodiments, the heat transfer material is selected from the group consisting of sand, limestone, and other calcites or oxides such as iron oxide, olivine, magnesia (MgO), attrition resistant alumina, carbides, silica aluminas, attrition resistant zeolites, and combinations thereof. The heat transfer material is heated by passage through an exothermic reaction zone of an external combustor. In embodiments, the heat transfer material may participate as a reactant or catalytic agent, thus 'relatively inert' as used herein with reference to the heat transfer material is as a comparison to the carbonaceous materials and is not used herein in a strict sense. For example, in coal gasification, limestone may serve as a means for capturing sulfur to reduce sulfate emissions. Similarly, limestone may serve to catalytically crack tar in the gasifier. In embodiments, the gasifier may be considered a catalytic gasifier, and a catalyst may be introduced with or as a component of the particulate heat transfer material. For example, in embodiments, a nickel catalyst is introduced along with other heat transfer material (e.g., olivine or other heat transfer material) to promote reforming of tars, thus generating a 'clean' synthesis gas that exits the gasifier. The clean synthesis gas may be an essentially tar-free synthesis gas. In embodiments, an amount of nickel catalyst (e.g., about 5, 10, 15, or 20 weight percent nickel) is circulated along with other heat transfer materials. In embodiments, the DFB gasifier 10 is operated in conjunction with a dual nickel fluidized bed utilized as synthesis gas conditioning, optionally upstream of a partial oxidation reactor. Such a dual nickel fluidized bed is disclosed in co-pending patent application Ser. No. 12/691, 297 (now U.S. Pat. No. 8,241,523), filed Jan. 21, 2010, which is hereby incorporated herein for all purposes not contrary to this disclosure.

The heat transfer material may have an average particle size in the range of from about 1 μm to about 100 mm, from about 1 μm to about 1 mm, or from about 5 μm to about 300 μm. The heat transfer material may have an average density in the range of from about 50 lb/ft$^3$ (0.8 g/cm$^3$) to about 500 lb/ft$^3$ (8 g/cm$^3$), from about 50 lb/ft$^3$ (0.8 g/cm$^3$) to about 300 lb/ft$^3$ (4.8 g/cm$^3$), or from about 100 lb/ft$^3$ (1.6 g/cm$^3$) to about 300 lb/ft$^3$ (4.8 g/cm$^3$).

Combustor/CSP.

System I comprises a combustor configured to heat the heat transfer material separated via one or more separators (e.g., cyclones) from the gasification product comprising entrained materials extracted from the pyrolyzer. The combustor may be any type of combustor known in the art, such as, but without limitation, fluidized, entrained, and/or non-fluidized combustors.

Referring now to FIG. 1, combustor 30 may be associated with a combustor seal pot 70 (CSP) configured to prevent backflow of materials into the primary and/or secondary gasifier cyclone(s) 40, 50; and/or one or more combustor cyclone(s) 60 configured to remove particulates from the combustor flue gas. It is to be understood that, in embodiments, combustor seal pot 70 may be replaced by one or more 'J'-valves or seals and/or one or more l'-valves or seals.

According to this disclosure, combustor 30 is configured for operation with supplemental fuel (in addition to the char carried over from gasifier 20) being introduced thereto, as indicated via line 8 in FIG. 1. The supplemental fuel may be introduced anywhere suitable into the combustor 30. For example, when the supplemental fuel is a gas (e.g., combustion air comprising light tars), the supplemental fuel may be introduced into combustor 30 along with combustion air (for example, via line 11 in FIG. 1. In embodiments, the supplemental fuel is introduced indirectly into combustor 30, for example, via introduction into an air preheater (e.g., a direct fired air preheater) upstream of combustor 30. In embodiments, the supplemental fuel may comprise primarily liquids, primarily solids, or primarily gas. In embodiments, the supplemental fuel may be introduced by combination with heat transfer material. For example, the supplemental fuel may be combined with makeup sand in lines 9 (9A and/or 9B) for introduction into combustor 30 (directly via lines 9/9A or via the GSP 80 via lines 9/9B). In embodiments, the supplemental fuel is introduced into combustor 30 via make-up sand inlet line 9A. In embodiments, the DFB gasifier comprises a positive displacement pump/compressor and fuel injector nozzles configured for introducing supplemental fuels into combustor 30. Other fuel feeding systems, as known in the art, may certainly be utilized. For example, systems for feeding solids may be utilized, for example, in embodiments wherein the supplemental fuel is primarily solid.

The supplemental fuel provides additional energy to heat the circulating heat transfer media. The supplemental fuels may be carbonaceous or non-carbonaceous waste streams and may comprise or be primarily gaseous, liquid, and/or solid. Any 'waste' stream containing hydrocarbons (e.g., any stream having BTU value) may be utilized as supplemental fuel to the combustor, and/or, in embodiments, may be utilized for the production of additional synthesis gas/increase in conversion of feed to product syngas via introduction into the pyrolyzer of the DFB gasifier. For example, it is envisaged that, in embodiments, waste materials such as, but not limited to, used car oil, animal (e.g., chicken) fat, cooking grease, etc., may be utilized to provide supplemental fuel to the combustor in embodiments.

The supplemental fuel for the gasifier may be produced via upstream process unit(s) 5, downstream process unit(s) 55, or both. Utilization of a 'waste' stream as a supplemental fuel for the combustor of the DFB gasifier may improve the overall efficiency of the gasification system, increasing the amount of synthesis gas produced and/or providing a more desirable synthesis gas (e.g., having a desired molar ratio of hydrogen to carbon monoxide and/or a reduced amount of tars), along with reducing/minimizing the quantity of waste effluent and/or emissions (e.g., hydrocarbon-containing waste material) that must be handled. As disposal of hydrocarbon-containing opportunity fuels such as, but not limited to, tank bottoms, API separator sludge, off-spec fuels, and the like (generally considered 'waste' streams) can be costly and time consuming, the disclosed system and method may enable reduction in operating expenses, along with enhanced overall unit efficiency and/or synthesis gas production.

At least a portion of the supplemental fuel 8 for combustor 30 may be a hydrocarbon-containing material produced via an upstream unit(s) 5. In such embodiments, line 6 may be fluidly connected with combustor 30 directly, or via line 8, for example, such that the hydrocarbon-containing material exiting upstream process unit(s) 5 via line 6 may be utilized as supplemental fuel for combustor 30. For example, upstream process unit 5 may comprise a dryer configured to dry a gasifier feed material (as discussed further hereinbelow). Such drying may produce a dryer vent stream comprising, for example, substantial VOC's. A portion or all of the dryer vent gas comprising hydrocarbons may be utilized as supplemental fuel for combustor 30.

In embodiments, the gasifier feed comprises a substantial moisture content, as discussed further hereinbelow. For example, the biomass feed may comprise a 'wet' biomass. The synthesis gas may be intended for downstream processing in unit(s) 55 comprising Fischer-Tropsch synthesis apparatus. Conditioning of synthesis gas is commonly utilized to provide a suitable synthesis gas for downstream utilization in the production of Fischer-Tropsch hydrocarbons. It may be desirable, in such embodiments, to provide a low moisture synthesis gas to such conditioning processes/apparatus. In such embodiments, drying of the gasifier feedstock (e.g., of a biomass feedstock) may be desirable in order to control the moisture content of the resulting product synthesis gas. The drying may be operable to provide an ultra-low moisture level (e.g., less than about 50, 45, or 40 volume percent $H_2O$ in the produced synthesis gas, suitable for subsequent conditioning. In embodiments, upstream unit(s) 5 may comprise a dryer that produces a waste product gas suitable for use as supplemental fuel in combustor 30. The waste gas from the dryer may contain volatile organic compounds (VOC's). The concentration of VOC's may vary greatly depending on, for example, the dryer type, the drying temperature, the drying medium, whether or not the vent stream is cooled, and etc. In embodiments, an air heated dryer is utilized. In embodiments, a low temperature air heated dryer is utilized. In embodiments, a superheated steam dryer is utilized. In embodiments, a superheated steam dryer with steam condensed out is utilized. In embodiments, the waste gas extracted from a dryer of upstream processing apparatus 5 via vet gas line 6 comprises from about 0.001 to about 70 volume percent VOC's, from about 0.01 to about 70 volume percent VOC's, or from about 0.1 to about 70 volume percent VOC's. In embodiments, the waste gas comprises less than about 70, 65, or 60 volume percent VOC's. The VOC-containing dryer vent gas may be condensed and soluble VOC's absorbed, for example in water. In such embodiments, the non-condensable gas containing VOC's may be utilized as supplemental fuel for combustor 30. Such utilization may reduce environmental emissions.

In embodiments, at least a portion of the supplemental fuel for combustor 30 is produced via one or more downstream processing unit(s) 55, and recycled to DFB 10 via one or more lines 45. One or more lines 56 are configured to extract one or more products from downstream processing apparatus 55. At least a portion of the supplemental fuel 8 for combustor 30 may be a hydrocarbon-containing material produced via a downstream processing unit(s) 55. In such embodiments, line 45 may be fluidly connected with combustor 30 directly, or via line 8, for example, such that the hydrocarbon-containing material exiting downstream process unit(s) 55 via line(s) 45 may be utilized as supplemental fuel for combustor 30. (This is described in more detail hereinbelow with reference to FIG. 2 and lines 145A, 145A', 145B, 145B', 145C, and 145D.) In embodiments, a hydrocarbon laden stream produced downstream of the DFB gasifier (e.g., tar that may result from a tar removal system of a downstream processing apparatus 55) is introduced into the combustor for recovery of the heating value thereof. The tar may be obtained from any tar removal apparatus known in the art, for example from a liquid absorber, such as, but not limited to, an OLGA (e.g., a DAHLMAN OLGA) unit. Such removed tars comprise heavy hydrocarbons which may be reused as a component of feed/fuel to combustor 30. In embodiments, tailgas (e.g., Fischer-Tropsch tailgas, PSA tailgas, VSA tailgas and/or upgrader tailgas) is utilized as a fuel to the combustor. The supplemental fuel may be a low pressure waste gas, such as PSA offgas. As mentioned hereinabove, the fluid recycled as supplemental fuel to the combustor of the DFB gasifier may comprise or may be primarily liquid, gaseous, or solid. For example, the supplemental fuel may comprise a liquid tar-containing stream or a fuel-enhanced combustion air (e.g., light tars and other light hydrocarbons and non-hydrocarbons stripped with combustion air or steam).

In embodiments, a liquid feed such as, but not limited to, refinery tank bottoms, heavy fuel oil, liquid fuel oil (LFO), Fischer-Tropsch tar, spent catalyst/wax, natural gas and/or another material (e.g., waste material) having a heating value, is introduced into the combustor. Nozzles may be positioned above the dipleg for introduction of such liquid material(s)

into the combustor. This may help the liquid flow into the downleg and avoid production of cold spots on the refractory. In this manner, circulating heat transfer material may be utilized to circulate the liquid and the liquid may be carried into the combustor via the combustor fluidization gas (e.g., air).

Thus, as mentioned hereinabove, in embodiments, DFB gasification system I further comprises downstream processing apparatus 55 downstream of dual fluidized bed gasifier 10 and configured to convert at least a portion of the gasifier product gas into a product, which is indicated as extracted from downstream processing unit(s) 55 via line 56. For example, downstream apparatus 55 may include one or more selected from Fischer-Tropsch synthesis apparatus, Fischer-Tropsch product upgrading apparatus, PSA, VSA, tar removal apparatus, power production apparatus, non-Fischer-Tropsch chemical production apparatus, and combinations thereof.

In embodiments, the DFB gasifier 10 is integrated into a biomass to fuels and/or biomass to power system. In embodiments, both power and Fischer-Tropsch fuels are produced from the gaseous products of DFB gasifier 10. In embodiments, DFB gasifier 10 is integrated with power production apparatus, whereby the system is utilized for (e.g., primarily for) the production of power. In embodiments, the system is configured as a BIGCC (biomass integrated gasification/combined cycle) system. In embodiments, the system is integrated with Fischer-Tropsch synthesis apparatus and utilized primarily for the production of liquid fuels (e.g., Fischer-Tropsch fuels).

Figure 2:
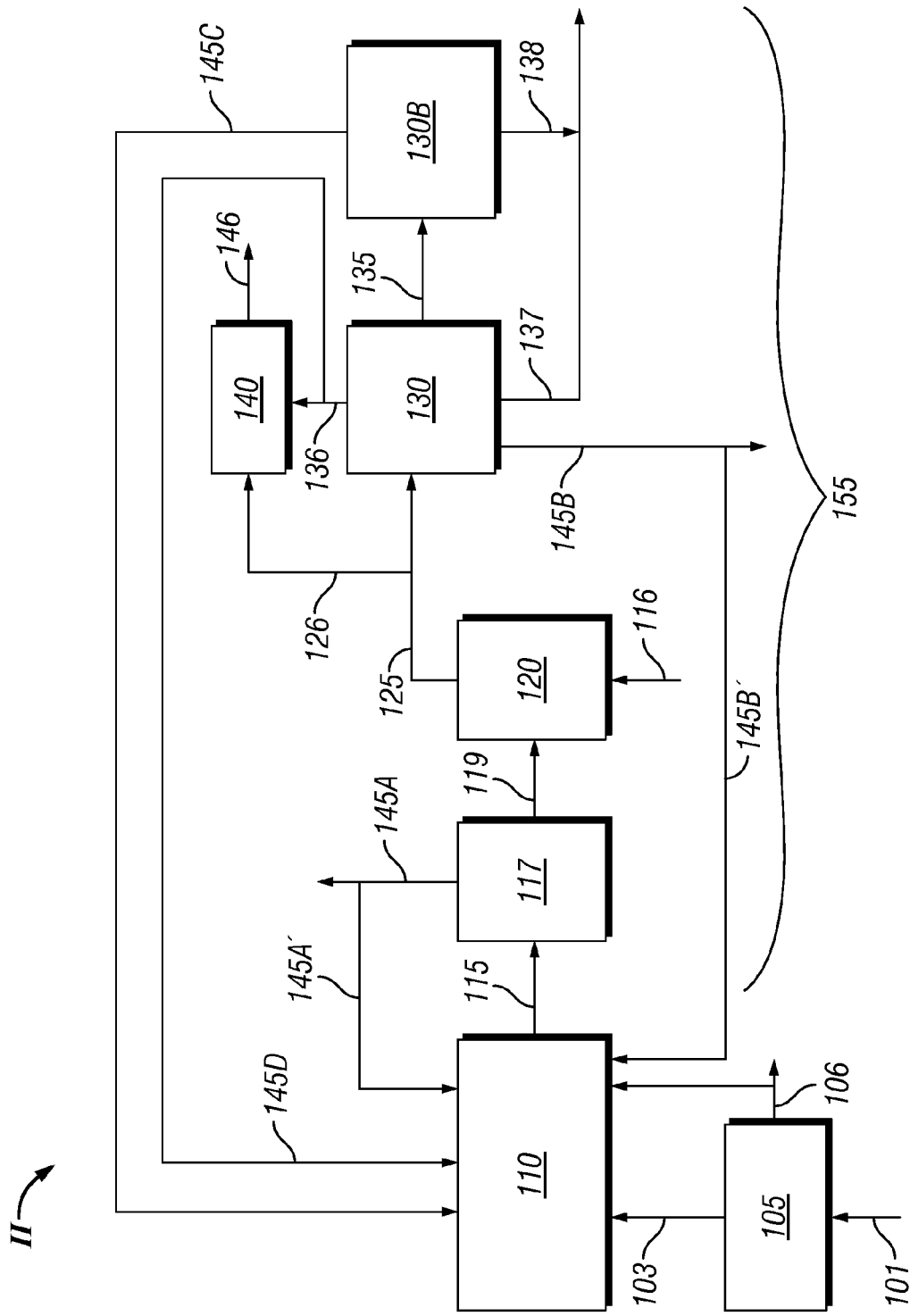
FIG. 2 is a schematic of an integrated system comprising a gasification system according to this disclosure integrated with Fischer-Tropsch synthesis and power production apparatus.

In embodiments, from about 10% to about 30% of the product synthesis gas from a DFB gasifier 10, as disclosed herein, is bypassed to power generation, and at least a portion of the remaining product gas is utilized for the production of Fischer-Tropsch fuels. In such embodiments, at least a portion of the Fischer-Tropsch tailgas from the production of Fischer-Tropsch fuels may be blended with the bypass synthesis gas to provide a gas with a suitable Wobbe number for the production of power. FIG. 2 is a schematic of an integrated system II comprising a dual fluidized bed gasifier 110 according to this disclosure (and as described hereinabove with reference to DFB gasifier 10 in FIG. 1) integrated with downstream apparatus 155 comprising Fischer-Tropsch synthesis and power production apparatus, and upstream processing apparatus 105 (e.g., comprising a dryer). Integrated system II comprises DFB gasifier 110, power production apparatus 140, and Fischer-Tropsch synthesis apparatus 130. Carbonaceous feed is gasified in the DFB gasifier 110, as described hereinabove, producing 'dirty' synthesis gas. Integrated system II may comprise apparatus configured for cleaning up the 'dirty' synthesis gas to provide a synthesis gas having fewer undesirable components (i.e. having reduced amounts of hydrogen, carbon monoxide, carbon dioxide, water vapor, hydrogen sulfide, and/or etc.) and/or a desired molar ratio of hydrogen to carbon monoxide. For example, in the embodiment of FIG. 2, a tar removal apparatus 117 is fluidly connected via line 115 with DFB gasifier 110 and a partial oxidation apparatus 120 is fluidly connected via line 119 with tar removal apparatus 117. In embodiments, downstream apparatus 155 comprises tar removal apparatus 117, partial oxidation apparatus 120, or both. Such cleaning apparatus may be desirable for subsequent downstream utilization of the product gas comprising syngas in downstream processes such as catalytic conversions and/or the production of power via introduction of the gas into a gas turbine. By removal of the tar, and utilization of at least a portion thereof as supplemental fuel to the combustor of the DFB gasifier, the relatively high heating content of the tar (and any hydrocarbons removed with the tar and/or the scrubbing oil, in applications utilizing oil for scrubbing of the tar in the tar removal apparatus) can be utilized to provide additional heat for the gasification (thus enabling higher operating temperature) and effective destruction of at least a portion of the tar removed via the tar removal apparatus.

In embodiments, a DFB gasification system of this disclosure comprises a tar removal system 117 downstream from the gasifier 110 and configured for removal of tar from the product synthesis gas. In embodiments, the tar removal system is downstream of cyclones and/or heat recovery apparatus of the DFB gasifier 110. The tar removal system may comprise any tar removal unit known in the art. The tar removal apparatus may operate via an oil or aqueous scrubbing process. In embodiments, tar removal apparatus 117 operates via a multistage solvent (e.g., oil) wash. The tar removal unit may be operable with synthesis gas at a temperature of at least or equal to about 650° F., 700° F., 750° F., 800° F., 850° F., or 900° F. As discussed hereinabove, a portion of the removed tars (e.g., the oil or aqueous wash fluid containing removed tar and/or other removed hydrocarbons) may be recycled to the combustor of the DFB gasification system for use as fuel. At least a portion of the tar-containing waste stream removed from tar removal apparatus 117 via tar removal line 145A may be recycled via line 145A' to the combustor of the DFB gasifier for use as supplemental fuel. For example, in the embodiment of FIG. 2, line 145A/145A' fluidly connect tar removal apparatus 117 with DFB gasifier 110, whereby tar removed via tar removal apparatus 117 may be utilized as fuel for the combustor (30) of the DFB gasifier 110.

As mentioned hereinabove, in embodiments, a partial oxidation reactor 120 is configured to subject the relatively 'dirty' synthesis gas produced in DFB gasifier 110 and optionally subjected to tar removal at 117, to oxidation, thus producing a relatively 'clean' synthesis gas. The POx reactor 120 may be fluidly connected with DFB gasifier 110 (e.g., directly via line 115 in embodiments absent tar removal apparatus 117), and/or tar removal apparatus 117 (e.g., via tar removal apparatus gas outlet line 119). The POx reactor may be operable at a temperature of greater than or equal to about 2000° F., 2100° F., 2200° F., 2300° F., 2400° F., 2500° F., or 2600° F. Oxygen may be introduced into partial oxidation reactor 120 via, for example, line 116. A line 125 may be configured to introduce at least portion of the 'cleaned' synthesis gas into a Fischer-Tropsch production reactor 130. A line 126 may be configured to introduce at least a portion of the 'cleaned' synthesis gas in line 125 into power production apparatus 140, configured for the production of power. It is to be understood that, in embodiments, clean-up apparatus (e.g., tar removal apparatus 117 and/or POx apparatus 120) is not utilized and/or different clean-up apparatus is utilized, and gasifier product gas may be introduced directly from DFB 110 (or from alternate clean-up apparatus) into FT synthesis apparatus 130 and/or power production apparatus 140.

As mentioned hereinabove, the disclosed gasification system may comprise downstream apparatus comprising a FT synthesis reactor 130. The Fischer-Tropsch synthesis reactor 130 may be any suitable Fischer-Tropsch reactor known in the art. In embodiments, the Fischer-Tropsch synthesis reactor comprises an iron-based catalyst. In embodiments, the Fischer-Tropsch synthesis reactor comprises a cobalt-based catalyst. In embodiments, the catalyst is a precipitated iron catalyst. In embodiments, the precipitated Fischer-Tropsch catalyst is an iron-based catalyst formed as described in or having the composition of Fischer-Tropsch catalyst described in U.S. Pat. No. 5,508,118 and/or U.S. patent application Ser. No. 12/189,424 (now U.S. Pat. No. 7,579,756), filed Aug. 11, 2008; Ser. No. 12/198,459, filed Aug. 26, 2008; Ser. No. 12/207,859, filed Sep. 10, 2008; Ser. No. 12/474,552, filed May 29, 2009; and/or Ser. No. 12/790,101, filed May 28, 2008, the disclosure of each of which is hereby incorporated herein in its entirety for all purposes not contrary to this disclosure.

Fischer-Tropsch production reactor 130 produces Fischer-Tropsch tailgas and a variety of FT synthesis products that are generally liquids at the operating temperature of the Fischer-Tropsch synthesis reactor. The liquid Fischer-Tropsch products may comprise primarily hydrocarbons. The liquid Fischer-Tropsch products may comprise primarily long-chain aliphatic hydrocarbons. Tailgas may be removed from Fischer-Tropsch synthesis reactor 130 via a Fischer-Tropsch tailgas line 136, and Fischer-Tropsch synthesis products may be removed via line 137 and/or 135. A spent catalyst/wax stream 145B comprising spent catalyst and associated Fischer-Tropsch hydrocarbons may be separated from the liquid products of the Fischer-Tropsch synthesis. At least a portion of the spent catalyst/wax may be recycled via recycle line 145W, as indicated in FIG. 2, as supplemental fuel to DFB gasifier 110 (e.g., as supplemental fuel to a combustor 30 of DFB gasifier 110).

For example, in embodiments, spent Fischer-Tropsch wax (which may contain up to about 5, 10, 15, 20, 25, or 30 weight percent catalyst) is introduced into the combustor (and/or the pyrolyzer/gasifier, as discussed further hereinbelow). In embodiments, Fischer-Tropsch wax is produced in downstream processing apparatus 155, and spent Fischer-Tropsch wax is recycled as fuel to the combustor. As discussed further hereinbelow, such spent wax can alternatively or additionally also be introduced into the gasifier, providing that it will crack under the operating conditions therein. In embodiments, petcoke is fed to the combustor, as a fuel source. A potential benefit of introducing spent catalyst/wax into the DFB gasifier is that, not only can the heating value of the wax be used to heat the heat transfer material and/or the hydrocarbons be converted into additional synthesis gas product gas, but the introduction of the spent catalyst into the DFB gasifier may allow for capture of the spent catalyst with the ash (e.g., via the ash recovery apparatus).

Integrated system II may further comprise (as a component of downstream processing apparatus 155) product upgrading apparatus 130B configured to upgrade the liquid products of the Fischer-Tropsch synthesis, and fluidly connected with Fischer-Tropsch synthesis reactor 130 via line 135, whereby at least a portion of the liquid products of the Fischer-Tropsch reactor 130 may be upgraded to more desired products. Product upgrading apparatus 130B may comprise hydrotreating apparatus, hydrocracking apparatus, hydroisomerization apparatus, and/or any other product upgrading apparatus known to those of skill in the art. The products of Fischer-Tropsch reactor 130 and/or the products of the product upgrading apparatus 130B, removed via lines 137 and/or 138, respectively, may comprise primarily jet fuel, primarily diesel fuel, primarily gasoline, primarily naphtha, or some combination of one or more selected from jet fuel, diesel fuel, gasoline, and naphtha.

Upgrading may create an upgrader tailgas, removed from integrated system II (e.g., from product upgrading apparatus 130B of downstream processing apparatus 155) via line 145C. As discussed hereinabove, such upgrader tailgas may be utilized as supplemental fuel for the combustor of the DFB gasification system 110, and/or as fluidization gas in a CSP, a GSP, and/or the gasifier/pyrolyzer thereof.

Power production apparatus 140 may be any apparatus known in the art for the production of power, indicated in FIG. 2 via line 146. In embodiments, power production apparatus 140 comprises a gas turbine. In embodiments, at least a portion of the tailgas removed from Fischer-Tropsch synthesis reactor 130 via line 136 is introduced into power production apparatus 140. In embodiments, a portion of the Fischer-Tropsch tailgas is utilized for power production and a portion is utilized in DFB gasifier 110, as discussed in detail hereinabove. For example, in embodiments a portion of the Fischer-Tropsch tailgas is utilized as supplemental fuel for the combustor of the DFB gasification system 110, and/or as fluidization gas in a CSP, a GSP, and/or the gasifier/pyrolyzer thereof. For example, as indicated in the embodiment of FIG. 2, a portion of the Fischer-Tropsch tailgas is introduced via line 145D into DFB gasifier 110, for example, for use as supplemental fuel for the combustor thereof.

In embodiments, the DFB gasification system comprises downstream processing apparatus comprising a POx unit, a boiler, and/or a NiDFB (mentioned hereinabove) downstream of the gasifier 110. In embodiments, the synthesis gas is provided for downstream production of chemicals, and the DFB gasification system further comprises downstream apparatus for the production of chemicals and/or fuels other than or in addition to Fischer-Tropsch fuels and/or chemicals. The downstream processing apparatus 155 may be any apparatus known in the art configured for the production of methanol, ethanol, ammonia, fertilizer, etc., from gasification product gas comprising hydrogen and carbon monoxide. In such embodiments, any suitable hydrocarbon containing 'waste' stream may be utilized as supplemental fuel to the combustor of the DFB gasifier.

In embodiments, the disclosed system is operable for the production of jet fuel, the system comprising a DFB gasifier as disclosed herein, tar reforming apparatus, one or more slurry Fischer-Tropsch reactors, hydrocracking apparatus and/or hydrotreating apparatus.

In embodiments, air is fed into the bottom of combustor 30 (e.g., via combustor air inlet line 11) and steam is fed into CSP 70. In embodiments, combustion air introduced into combustor 30 (for example, via line 11) comprises oxygen-enriched air. The steam feed rate to CSP 70 may be about 4000 lb/h (for a plant operating at about 500 dry tons/day, for example). The steam passes through and exits combustor cyclone 60. The cyclone efficiency is dramatically affected by the superficial velocity thereto. The higher the superficial velocity, the better the cyclone efficiency. If the ACFM (actual cubic feet per minute) can be reduced, the cyclone efficiency may be improved (based on more solids per cubic foot). Thus, in embodiments, air is fed into CSP 70, rather than steam. In embodiments, 20-25% of the fluidization gas (e.g., air) for combustor 30 is introduced into or via CSP 70. In embodiments, combustion air, rather than steam, is fed into CSP 70 (e.g., via line 141B), such that heat is not removed from combustor 30 due to the flow of steam therethrough, and the downstream combustor separator(s)/cyclone(s) 60 and/or the downstream gasifier 20 may be incrementally smaller in size. That is, the introduction of air (e.g., at about 1000° F.), rather than the introduction of (e.g., 550° F.) steam into CSP 70 (which is heated therein to, for example, about 1800° F.) may serve to reduce the amount of steam in gasification system I/II. This may allow the downstream vessel(s) to be smaller. When air is introduced into CSP 70, partial combustion of char may occur in the seal pot with air (rather than steam) and the downstream combustor cyclone(s) 60 and/or gasifier 20 may be smaller. Accordingly, in embodiments the combustor is reduced in size by introduction of a portion of the combustor fluidization gas into CSP 70. For example, if the desired fluidization velocity at the top (e.g., proximate the flue gas exit) of the combustor is 30-35 ft/s, only about 75-80% (i.e. about 20 feet/s) may need to be introduced into the bottom of the combustor because 20-25% of the fluidization gas may be introduced into or via CSP 70. Thus, the combustor size may be reduced. Another benefit of introducing combustor fluidization gas via the CSP is that the combustor cyclone(s) can be incrementally smaller and/or be operated more efficiently. Also, nitrogen in the air can be heated and thermal efficiency gained by eliminating or reducing the need for superheating steam (e.g., at 4000 lb/h of steam). (When steam is utilized, it may be a virtually complete loss of the steam. Very little heat may be recoverable therefrom, although the steam may flow through a downstream heat exchanger on, for example, the flue gas line 202).

In embodiments, the fluidization gas for one or more of the gasifier 20 (e.g., in line(s) 141, 141A, and/or 141D), the gasifier seal pot 80 (e.g., in line(s) 141D and/or 9B), the combustor seal pot 70 (e.g., in line(s) 141 and 141B), and the combustor 30 (e.g., in line(s) 8, 9, 9A, and/or 11) comprises LP fuel gas. The fluidization gas in combustor 30 may comprise primarily air. The gas feed rate to the combustor may be greater than, less than, or about 10, 15, 20, 25, 30, or 35 feet/s in certain embodiments.

The slope from combustor seal pot 70 into combustor 30 may provide an angle α, such that the heat transfer media (e.g., sand), air and flue gas will flow over and back into the combustor. The inlet flow of fluidization gas into the combustor may be determined by the heat transfer material. The inlet fluidization velocity is at least that amount sufficient to fluidize the heat transfer media within combustor 30. In embodiments, the inlet velocity to the combustor is greater than or about 10, 15, 20, 25, or 30 ft/s. In embodiments, the inlet velocity of fluidization gas into the bottom of the combustor is in the range of from about 15 to about 35 ft/s, from about 20 to about 35 ft/s, or from about 20 to about 30 ft/s. At higher elevations in the combustor, flue gas is created. This limits the suitable rate for introduction of fluidization gas into the combustor.

In embodiments, the combustor is operated in entrained flow mode. In embodiments, the combustor is operated in transport bed mode. In embodiments, the combustor is operated in choke flow mode. The bottom of the combustor (for example, at or near the inlet of circulating heat transfer media from the gasifier) may be operated at approximately 1100° F., 1200° F., 1300° F., or 1400° F., and the exit of the combustor (at or near the top thereof; for example, at or near the exit of materials to cyclone(s)) may be operated at approximately or greater than about 1400° F., 1500° F., 1600° F., 1700° F., 1800° F., 1900° F., or 2000° F. Thus, the actual cubic feet of gas present increases with elevation in the combustor (due to combustion of the char and/or supplemental fuel). In embodiments, excess air flow is returned to the combustor.

The fluidization gas for the combustor may be or may comprise oxygen in air, oxygen-enriched air, substantially pure oxygen, for example, from a vacuum swing adsorption unit (VSA) or a pressure swing adsorption unit (PSA), oxygen from a cryogenic distillation unit, oxygen from a pipeline, or a combination thereof. The use of oxygen or oxygen-enriched air may allow for a reduction in vessel size, however, the ash fusion temperature must be considered. The higher the oxygen concentration in the combustor feed, the higher the temperature of combustion. The oxygen concentration is kept at a value which maintains a combustion temperature less than the ash fusion temperature of the feed. Thus, the maximum oxygen concentration fed into the combustor can be selected by determining the ash fusion temperature of the specific feed utilized. In embodiments, the fluidization gas fed to the bottom of the combustor comprises from about 20 to about 100 mole percent oxygen. In embodiments, the fluidization gas comprises about 20 mole percent oxygen (e.g., air). In embodiments, the fluidization gas comprises substantially pure oxygen (limited by the ash fusion properties of the char, supplemental fuel and heat transfer material fed thereto). In embodiments, the combustor fluidization gas comprises PSA tailgas.

The combustor may be designed for operation with about 10 volume percent excess oxygen in the combustion offgas. In embodiments, the combustor is operable with excess oxygen in the range of from about 0 to about 20 volume percent, from about 1 to about 14 volume percent, or from about 2 to about 10 volume percent excess $O_2$. In embodiments, the amount of excess $O_2$ fed to the combustor is greater than 1 volume percent and/or less than 14 volume percent. Desirably, enough excess air is provided that partial oxidation mode is avoided. In embodiments, the DFB gasification system is operable with excess $O_2$ to the combustor in the range of greater than 1 to less than 10 volume percent, and the flue gas comprises less than 15, 10, or 7 ppm CO. In embodiments, oxygen is utilized to produce more steam. In embodiments, for example, when the hot flue gas will be introduced into a second combustor (for example, without limitation, into the combustor of a second dual fluidized bed (DFB) gasifier as disclosed, for example, in U.S. paten application Ser. No. 12/691,297 (now U.S. Pat. No. 8,241,523), filed Jan. 21, 2010, the disclosure of which is hereby incorporated herein for all purposes not contrary to this disclosure), the amount of excess oxygen may be in the range of from about 5 to about 25 percent, or may be greater than about 5, 10, 15, 20, or 25%, providing oxygen for a downstream combustor. In embodiments in which steam may be sold at value, more excess $O_2$ may be utilized to produce more steam for sale/use. In embodiments, a CO-rich, nitrogen-rich flue gas (e.g., in line 106 and/or 202) is produced by operation of combustor 30 of the herein disclosed DFB gasification system at excess oxygen of greater than 7, 10 or 15%.

Combustor 30 may be fabricated with a 2-4 inch thick hard face refractory. In embodiments, the combustor has at least 2-inch hard face. In embodiments, combustor 30 has at least 3-inch hard face. In embodiments (e.g., in lower insulation embodiments), the combustor may comprise a hard face refractory with an insulating layer surrounding the hard face. The insulating layer may be thicker than or less thick than 2 inches. In embodiments, the combustor vessel is made of carbon steel. In embodiments, the combustor vessel is not made of carbon steel. In embodiments, the insulation layer is thicker than the hardface layer. The hardface layer may have a higher thermal conductivity and durability than the insulating layer.

In embodiments, the combustor is substantially cylindrical. In embodiments, the combustor is non-cylindrical. In embodiments, the combustor is conical at the bottom and/or the top. In embodiments, the combustor is conical at the bottom, for example, when the fluidization gas for the combustor comprises a high concentration of oxygen. In embodiments, the combustor comprises a conical disengaging section at the top (however, this embodiment may undesirably reduce the superficial velocity into downstream combustor gas/solid separator(s) 60). In embodiments, the outlet of the combustor comprises channels configured for recycle of heat transfer material to the fluidized bed of the combustor and reduce particulate loading in primary separator(s). In embodiments, the outlet of the combustor is corrugated to reduce particulate loading on primary cyclone(s).

In embodiments, the combustor is pressurized. The combustor may be operable at a pressure of greater than 0 psig to a pressure that is at least 2 psig less than the operating pressure of the gasifier. That is, in order to maintain continuous flow of materials from the combustor back into the gasifier, the pressure of the combustor, $P_C$, at the inlet to the combustor which may be measured by a pressure gauge located proximate the flue gas exit, is less than the gasifier/pyrolyzer pressure, $P_G$. The pressure at the HTM outlet of the combustor, $P_{C,BOTTOM}$ (which must be greater than $P_G$), equals the sum of the pressure, $P_C$, at the top of the combustor and the head of pressure provided by the material in the combustor. The head of pressure provided by the heat transfer material/gas mixture within the combustor is equal to $\rho_C gh$, where $\rho_C$ is the average density of the material (e.g., the fluidized bed of heat transfer material) within the combustor, g is the gravitational acceleration, and h is the height of the 'bed' of material within the combustor. The height of material (e.g., heat transfer material such as sand, and other components such as char and etc.) within the combustor is adjusted to ensure flow of materials back to the gasifier.

Thus, $P_{C,BOTTOM}$ which equals $P_C + \rho_C g \Delta h$ must be greater than the pressure of the gasifier, $P_G$. The heights and relationships between the combustor and gasifier are selected such that adequate pressure is provided to maintain continuous flow from the combustor to the gasifier and back.

In embodiments, the operating pressure of the combustor, $P_C$, is up to or about 40, 45, or 50 psig. In embodiments, based on 30-40 ft/s design criteria for gas velocity into the combustor, the maximum operating pressure of the combustor is about 45 psig. In embodiments, the gas velocity into the combustor is less than 40, 35, 30, 25, or 20 ft/s. In embodiments, if the operating pressure of the combustor is increased, then the pressure energy can be recovered by the use of an expander. Thus, in embodiments, one or more expander is positioned downstream of the combustor gas outlet and upstream of heat recovery apparatus (discussed further hereinbelow). For example, when operated with pure oxygen, the diameter of the combustor may be smaller at the bottom than the top thereof. In embodiments, an expander is incorporated after the cyclones (because cyclone efficiency increases with higher pressures). In embodiments, one or more expander is positioned upstream of one or more baghouse filters, which may be desirably operated at lower pressures. In embodiments, the system comprises an expander downstream of one or more combustor cyclones. The expander may be operable at a pressure greater than 15, 20 or 30 psig. The one or more expanders may be operable to recover PV energy.

Combustion Separator(s)/Heat Recovery:

The superficial velocity selected for the gas/solid separators (which may be cyclones) may be selected to maximize efficiency and/or reduce erosion thereof. The cyclones may be operable at a superficial velocity in the range of from about 65 to about 85 feet/s, from about 70 to about 85 feet/s, or at about 65, 70, 75, 80, or 85 ft/s.

As shown in FIG. 1, the combustor outlet may be fluidly connected via flue gas line 106 with one or more HTM cyclones 60. The one or more cyclones may be configured in any arrangement, with any number of cyclones in series and/or in parallel. For example, a first bank of cyclones (e.g., from 1 to four or more cyclones) operated in parallel may be in series with a second bank of cyclones comprising from 1 to 4 or more cyclones in parallel and so on. The system can comprise any number of banks of cyclones.

The one or more combustion HTM cyclones may be connected with one or more ash cyclones, and the ash cyclones may be followed by heat recovery. In such embodiments, the cyclones are high temperature, refractory-lined or exotic material cyclones. In embodiments, the DFB gasification system comprises two, three or four combustor separators in series. In embodiments, one to two banks of combustion HTM cyclones are followed by one or more banks of ash cyclones. In embodiments, two combustion HTM cyclones are followed by one or more than one combustor ash cyclone. The one or more HTM cyclone may have a performance specification of greater than 98, greater than 99, greater than 99.9 or greater than 99.98% removal of heat transfer material. Two or more combustor cyclones may be utilized to achieve the desired efficiency. In embodiments, the one or more ash cyclone may be operated to remove ash, for example, in order to reduce the size of a downstream baghouse(s). In embodiments, the one or more ash cyclones are operable to provide greater than about 60%, 70%, 80%, 85% or 90% ash removal from a gas introduced thereto.

In alternative embodiments, heat recovery apparatus is positioned between the HTM cyclone(s) and the ash removal cyclone(s). In such embodiments, combustor flue gas is introduced into one or more combustor HTM cyclones. The gas exiting the one or more HTM cyclones is introduced into one or more heat recovery apparatus. The gas exiting the one or more heat recovery apparatus is then introduced into one or more ash cyclones for removal of ash therefrom. The heat recovery apparatus may comprise one or more selected from the group consisting of air preheaters (e.g., a combustion air preheater), steam superheaters, waste heat recovery units (e.g., boilers), and economizers. In embodiments, heat recovery generates steam. In such embodiments comprising heat recovery upstream of ash removal, the one or more ash removal cyclones may not be refractory-lined, i.e. the one or more ash removal cyclones may be hard faced, but lower temperature cyclone(s) relative to systems comprising ash removal upstream of heat recovery. In embodiments, the ash removal cyclones are operable at temperatures of less than 400° F., less than 350° F., or less than 300° F.

In embodiments, heat recovery is utilized to produce superheated steam. In embodiments, the superheated steam is produced at a temperature in the range of from about 250° F. to about 400° F., and a pressure in the range of from about 100 psig to about 300 psig.

In embodiments comprising heat recovery upstream of ash recovery, the face of the tubes may be built up and/or the velocity reduced in downward flow in order to minimize erosion of heat recovery apparatus (e.g., heat transfer tubes). The velocity to the cyclones in such embodiments may be less than 80, 75, 70, or 65 ft/s. If the velocity is reduced appropriately, the ash will not stick to the heat recovery apparatus (e.g., to waste heat boiler tubes and/or the superheater tubes), and will not unacceptably erode same.

In embodiments, combustor flue gas is introduced directly or indirectly to the economizer of a boiler for recovery of heat and, for example, power production.

In embodiments, the DFB system comprises one or more disengaging box. Such a disengaging box may be utilized in place of or in addition to the combustor cyclone(s) and/or the gasifier cyclones(s). Such a disengaging box may comprise a plurality of channels. Such a disengaging box may be more desirable on the process gas (gasifier/pyrolyzer) side to further ensure that HTM is effectively removed from the gasification process gas.

In embodiments, equilibrium is pushed toward the formation of hydrogen and carbon monoxide during pyrolysis via, for example, the incorporation of a material that effectively removes carbon dioxide. For example, NaOH may be introduced into the system (e.g., to or with the heat transfer material, to gasifier 20, to combustor 30, or elsewhere in the system) to produce $Na_2CO_3$, and/or CaO injection may be utilized to absorb $CO_2$, forming $CaCO_3$, which may later be separated into $CO_2$ and CaO which may be recycled into the system. The NaOH and/or CaO may be injected into gasifier or pyrolyzer 20. Addition of such carbon dioxide reducing material may serve to increase the amount of synthesis gas produced (and thus available for downstream processes such as, without limitation, Fischer-Tropsch synthesis and non-Fischer-Tropsch chemical and/or fuel production) and/or may serve to increase the Wobbe number of the gasifier product gas for downstream power production. Such or further additional materials may also be utilized to adjust the ash fusion temperature of the carbonaceous feed materials within the gasifier. As with the optional carbon dioxide reducing materials, such ash fusion adjustment material(s) may be incorporated via addition with or to the feed, with or to the heat transfer media, to gasifier 20, to combustor 30, and/or elsewhere. In embodiments, the additional material(s) are added with or to the feed to the gasifier. In embodiments, the additional material(s) are added with or to the heat transfer media.

Reactor/Gasifier/Pyrolyzer 20.

Pyrolyzer 20 is a reactor comprising a fluid-bed of heat transfer material at the reactor base, and is operated at feed rates sufficiently high to generate enough gasifier product gas to promote circulation of heat transfer material and gasified char, for example, by entrainment. The gasifier may be a hybrid with an entrained zone above a fluidized bed gasifier, as described in U.S. Pat. No. 4,828,581, which is hereby incorporated herein by reference in its entirety for all purposes not contrary to this disclosure.

In embodiments, gasifier/pyrolyzer 20 is a cylindrical vessel comprising a conventional gas distribution plate 95 near the bottom, and comprising inlets for feed material(s), heat transfer material(s), and fluidizing gas. The gasifier vessel comprises an exit at or near the top thereof and is fluidly connected thereby to one or more separators from which gasification product gas is discharged and solids are recycled to the bottom of the gasifier via an external, exothermic combustor operable to reheat the separated, heat transfer material. The gasifier operates with a recirculating particulate phase (heat transfer material), and at inlet gas velocities in the range sufficient to fluidize the heat transfer material, as further discussed hereinbelow.

Referring now to FIG. 1, the angle α between the seal pot and the vessel (i.e. between the combustor seal pot 70 and the combustor 30 and/or between the gasifier seal pot 80 and the gasifier 20) may be in the range of from about 5 to about 90°, from about 5 to about 80°, or from about 5 to about 60°. In embodiments, α is less than 45°. Utilization of a higher α generally results in a taller seal pot. Lower angles may be operable with the use of fluidization/aeration to maintain fluidization. Generally, for α angles between 5 and about 45 degrees, fluidization/aeration may also be utilized. In embodiments, a lower angle, such as an angle of about 5 degrees, is utilized in the design so that the seal pot (CSP and/or GSP) is relatively short and the overall height of the unit (i.e. the stackup) may be reduced.

Gasifier Feed.

As indicated in the embodiment of FIG. 1, the inlets for feed via feed inlet line or chute 90 and recirculating heat transfer material via heat transfer line 35 may be located at or near the base of gasifier 20, and/or may be proximate the pyrolyzer gas distributor 95. The feed may be selected from the group consisting of biomass, RDF, MSW, sewage sludge, and combinations thereof. In embodiments, the feed comprises biomass. It is envisaged that coal may be added to the gasifier if it is suitable coal, and this depends on the ash fusion temperature. Refinery tank bottoms, heavy fuel oil, etc., which may, in embodiments, be contaminated with small solids may be introduced into the gasifier and/or the combustor, so long as the ash fusion temperature therein is not adversely affected. In embodiments, petcoke is ground to a size in the range suitable to ensure volatilization within the pyrolyzer. In embodiments, petcoke is introduced into the pyrolyzer as a component of the carbonaceous feedstock. In embodiments, the gasifier feed further comprises Fischer-Tropsch synthesis products (e.g., Fischer-Tropsch wax) and/or spent catalyst (e.g., spent catalyst in product wax, recycled via line 145B'). In embodiments, Fischer-Tropsch synthesis products are produced, from at least a portion of the gasifier product gas, in downstream processing apparatus 155, and a portion of the Fischer-Tropsch product(s) (e.g., Fischer-Tropsch wax in line(s) 137 and/or 138) that will crack under the operating conditions therein is recycled as feed/fuel to the gasifier.

The gasifier feed may be introduced thereto via any suitable means known to one of skill in the art. The feed may be fed to the gasifier using a water cooled rotary screw. The feed may be substantially solid and may be fed utilizing a screw feeder or a ram system. In embodiments, the feed is introduced into the gasifier as a solid. In embodiments, dual feed screws are utilized and operation is alternated therebetween, thus ensuring continuous feeding.

As indicated in FIG. 1, a gasifier feed inlet line or chute 90 may be configured to provide an angle β between the feed inlet line 90 and gasifier vessel 20. The feed inlet angle may be in the range of from about 5 to about 20 degrees, from about 10 to about 15 degrees, or from about 5 to about 35 degrees, such that the feed flows substantially uniformly into (i.e. across the cross section thereof) of pyrolyzer 20. In this manner, feed isn't limited to one side of the pyrolyzer, for example. A purge gas may also be introduced via purge gas line 91 with the feed (for example, from a lockhopper) via the feed inlet/chute 90 to maintain a desired pressure and/or to aid in feeding the feed to the pyrolyzer. In embodiments, the purge gas is selected from the group consisting of carbon dioxide, steam, fuel gas, nitrogen, synthesis gas, flue gas from the combustor (e.g., in flue gas line(s) 106 and/or 202) and combinations thereof. In embodiments, the purge gas comprises nitrogen. In embodiments, the feed is not purged. If $CO_2$ recovery is present, for example downstream in the system, it may be desirable for the feed purge gas to be or to comprise carbon dioxide.

In embodiments, the gasifier feed is pressurized. The carbonaceous feed material may be fed to the gasifier at a pressure in the range of from about 0 to about 40 psig. A dryer may be utilized to dry the feed and/or may be operated at a pressure, thus providing the feed material to the gasifier at a desired pressure and/or moisture content. The feed may be dried prior to introduction into the gasifier, and/or may be introduced hot (e.g., at a temperature of greater than room temperature). In embodiments, the feed is cold (e.g., at a temperature of less than or equal to room temperature). The feed may be introduced into the gasifier at a temperature in the range of from about −40 to about 600° F. In embodiments, the feed is at a temperature in the range of from −40 to about 250° F. In embodiments, the feed is at ambient temperature. In embodiments, the feed is at room temperature. In embodiments, a feed material is comminuted prior to introduction into the gasifier. In embodiments, a feed material is preheated and/or comminuted (e.g., chipped) prior to introduction into the gasifier. Feed bin 7 may be operable as a dryer, as disclosed, for example, in U.S. Pat. App. No. 61/551,582, filed Oct. 26, 2011.

Optimization of Gasifier Feed Drying to Control $H_2$:CO Ratio in Product Synthesis Gas.

In embodiments, the moisture content of the feed is in the range of from about 5% to about 60%. In embodiments, the feed has a moisture content of greater than about 10, 20, 30, or 40 wt %. In embodiments, the feed has a moisture content of less than about 10, 20, 30, or 40 wt %. In embodiments, the moisture content of the feed is in the range of from about 20 to about 30 wt %. In embodiments, the moisture content of the feed is in the range of from about 20 to about 25 wt %.

In embodiments, more drying of the feed material may be desired/utilized to provide syngas (via, for example, feed drying, gasification and/or partial oxidation) at a molar ratio of $H_2$/CO suitable for downstream Fischer-Tropsch synthesis in the presence of an iron catalyst (i.e. for which a molar ratio of hydrogen to carbon monoxide in the range of from about 0.7 to about 1.7, i.e. about 1:1, is generally desirable). In embodiments, less drying may be desired/utilized, for example, to provide a synthesis gas having a molar ratio of $H_2$/CO suitable for downstream Fischer-Tropsch synthesis in the presence of a cobalt catalyst (i.e. for which a molar ratio of hydrogen to carbon monoxide of about 2:1 is generally desirable). As mentioned hereinabove, in embodiments, upstream processing unit(s) 5 (105 in the embodiment of FIG. 2) comprises a dryer utilized to dry a 'wet' feed material (introduced thereto via line 1 in FIG. 1 or line 101 in FIG. 2) prior to introduction into pyrolyzer 20. Any suitable dryer known in the art may be utilized to dry the feed material. Dried feed material may be introduced via a line 3 (103 in FIG. 2) into a feed bin 7 for introduction into pyrolyzer 20 (dual fluidized bed gasification unit 110 in FIG. 2). In embodiments, at least a portion of the hot combustor flue gas (described further hereinbelow) is utilized to dry the gasifier feed in a dryer prior to introduction of the dried feed material into the gasifier 20. As mentioned hereinabove, at least a portion of dryer vent gas in line 6/106 may be utilized as fluidization gas and/or feed (e.g., supplemental fuel to combustor 30) in one or more component(s) of DFB gasifier 10/110.

In embodiments, the feed rate (flux) of carbonaceous material to the gasifier is greater than or equal to about 2000, 2500, 3000, 3400, 3500, 4000, or 4200 lb/h/ft². The design may allow for a superficial velocity at the outlet (top) of the gasifier in the range of 40-45 ft/s (assuming a certain carbon conversion/volatilization/expansion). In embodiments, the carbon conversion is in the range of from about 0 to about 100%. In embodiments, the carbon conversion is in the range of from about 30 to about 80%. The gasifier vessel size, i.e. the diameter thereof, may be selected based on a desired outlet velocity.

An important factor for operating a fluidized or entrained bed gasification process is the product synthesis gas velocity in the gasifier. Reduced evolution of synthesis gas at turndown rates may disrupt operation of the gasifier. At a constant pressure, the volume of gas exiting the pyrolyzer and entering the cyclones decreases at turndown, thus reducing the circulation of the heat transfer material and decreasing the efficiency of the cyclones. In embodiments, the velocity of the product synthesis gas out of the gasifier is maintained substantially constant at turndown via a reduction in the outlet pressure of the gasifier. The combustor pressure may be maintained at the pre-turndown/operating pressure. In this manner, a downstream unit (such as, for example, a downstream Fischer-Tropsch reactor or downstream gas turbine) may be taken offline (for example, for maintenance) without shutting down the DFB gasifier. In embodiments, maintenance of the product synthesis gas velocity during turndown is enabled via configuring the DFB gasifier for operation at a high pressure differential between the pyrolyzer and combustor thereof. Desirably, the seal legs (41 and/or 51) are designed such that the pressure differential may be so adjusted.

Gasifier fluidization gas may be fed to the bottom of gasifier 20 (for example, via a distributor 95) at a superficial velocity in the range of from about 0.5 ft/s to about 10 ft/s, from about 0.8 ft/s to about 8 ft/s, or from about 0.8 ft/s to about 7 ft/s. In embodiments, the pyrolyzer fluidization gas (e.g., steam and/or alternate fluidization gas) inlet velocity is greater than, less than, or equal to about 1, 2, 3, 4, 5, 6, 7 or 8 ft/s. In embodiments, a gasifier fluidization gas superficial velocity of at least or about 5, 6, 7, or 8 ft/s is utilized during startup. Residence time of the carbonaceous material in the pyrolyzer may be in the range of from about 1 to about 7 sec, from about 2 to about 6 sec, or from about 2 to about 4 sec.

The fluidization gas to gasifier 20 may be selected, without limitation, from the group consisting of steam, flue gas, synthesis gas, LP fuel gas, tailgas (e.g., Fischer-Tropsch tailgas, upgrader tailgas, VSA tailgas, and/or PSA tailgas) and combinations thereof. In embodiments, the gasifier fluidization gas comprises Fischer-Tropsch tailgas. In embodiments, the gasifier fluidization gas comprises upgrader tailgas. By utilizing upgrader tailgas, additional sulfur removal may be effected, as the upgrader tailgas may comprise sulfur.

In embodiments, the pyrolyzer fluidization gas comprises PSA tailgas. Such embodiments may provide substantial hydrogen in the gasifier product gas (e.g., in line(s) 114, 114A, and/or 114B), and may be most suitable for subsequent utilization of the product gas in downstream processes for which higher molar ratios of hydrogen to carbon monoxide are desirable (e.g., for which hydrogen to carbon monoxide molar ratios of about 1.8:1 to about 2:1 may be desired). For example, higher molar ratios of hydrogen to carbon monoxide may be desirable for downstream processes such as a nickel dual fluidized bed gasification (for which $H_2$/CO ratio of about 1.8:1 to about 2:1 may be desired). Such a dual fluidized bed (DFB) gasifier is disclosed, for example, in U.S. patent application Ser. No. 12/691,297 (now U.S. Pat. No. 8,241,523), filed Jan. 21, 2010, the disclosure of which is hereby incorporated herein for all purposes not contrary to this disclosure. Utilization of PSA tailgas for gasifier fluidization gas may be less desirable for subsequent utilization of the gas for POx (for which $H_2$/CO molar ratios closer to or about 1:1 may be more suited), as the hydrogen may be undesirably high. In embodiments, the gasification product gas is dried (for example, in a burner) to a moisture content of less than a desired amount (e.g., less than about 10, 11, 12, 13, 14, or 15 percent) in order to provide a suitable composition (e.g., $H_2$/CO molar ratio) for downstream processing (e.g., for downstream POx). In embodiments, a combination of feed drying, DFB gasification and POx is utilized to provide a synthesis gas suitable for downstream Fischer-Tropsch synthesis utilizing a cobalt catalyst.

The temperature at or near the top of the gasifier (e.g., proximate entrained product removal therefrom) may be in the range of from about 1000° F. to about 1700° F., from about 1100° F. to about 1700° F., from about 1200° F. to about 1700° F., from about 1000° F. to about 1600° F., from about 1100° F. to about 1600° F., from about 1200° F. to about 1600° F., from about 1000° F. to about 1500° F., from about 1100° F. to about 1500° F., from about 1200° F. to about 1500° F., from about 1200° F. to about 1450° F., from about 1200° F. to about 1350° F., from about 1250° F. to about 1350° F., from about 1300° F. to about 1350° F., or about 1350° F.

In embodiments, the gasifier pressure is greater than about 2 psig. In embodiments, the gasifier pressure is less than or equal to about 45 psig. In embodiments, the gasifier pressure is in the range of from about 2 psig to about 45 psig.

Circulating heat transfer material may be introduced into a lower region of the gasifier. The heat transfer material may be introduced approximately opposite introduction of the gasifier feed material. To maintain suitable flow, the HTM inlet may be at an angle α in the range of from about 20 degrees to about 90 degrees, or at an angle α of greater than or about 20, 30, 40, 50, or 60 degrees. The heat transfer material may be introduced at a temperature in the range of from about 1400° F. to about 1800° F., from about 1450° F. to about 1800° F., from about 1525° F. to about 1575° F., or about 1550° F.

In embodiments, the pyrolyzer comprises a gas distributor 95. In embodiments, the circulating heat transfer material is introduced to pyrolyzer 20 at a location at least 4, 5, 6, 7, 8, 9 or 10 inches above pyrolyzer gas distributor 95. The heat transfer material may be introduced at a position in the range of from about 4 to about 10 inches, or from about 4 to about 6 inches above distributor 95. In embodiments, the distributor is operable to provide a gas flow rate of at least or about 4, 5, 6, 7, 8, 9, or 10 ft/s, for example, during startup. Gasifier distributor 95 (and/or a distributor 96 in a combustor seal pot, a distributor 97 in gasifier seal pot 80, and/or a distributor 98 in combustor 30) may comprise a ring distributor, a pipe distributor, a Christmas tree distributor, or other suitable distributor design known in the art. In embodiments, the distributor comprises a pipe distributor that may be loaded through a side of the vessel for ease of nozzle replacement thereon (generally suitable in embodiments in which the running pressure is less than 12 or 15 psig inclusive). Distributors with fewer inlets (e.g., Christmas tree distributors and/or ring distributors) may be more desirable for higher pressure applications.

In embodiments, the temperature differential between the gasifier and the combustor (i.e. $T_C$-$T_G$) is maintained at less than about 250° F., 260° F., 270° F., 280° F., 290° F., 300° F., 310° F., 320° F., 330° F., 340° F., or 350° F., or is maintained at a temperature within any range therebetween. If $T_C$-$T_G$ is greater than about 300° F., sand or other elevated temperature heat transfer material may be added to the system.

Tramp Removal System.

Gasifier distributor 95 may be positioned 3 to 6 feet above the refractory bottom. In embodiments, the distributor is positioned at least 3, 4, 5, or at least 6 feet above the refractory bottom. Below the distributor is thus created a dead space or 'dead zone' 94, as indicated (not to scale) in the embodiment of FIG. 1. Dead zone 94 is located between the distributor and the bottom of the vessel. In embodiments, such a dead zone may be designed to facilitate removal of heat transfer material from below a distributor. Any materials that are too heavy to fluidize may settle below the distributor of a system component, thus creating a heat sink area. Because there may be little or no fluidization below the distributor, heat transfer material may become trapped below the distributor and cool (e.g., to less than 1550° F. or to below another HTM inlet gasifier temperature). The bottom of the gasifier (or another component such as a combustor seal pot 70, a gasifier seal pot 80, or combustor 30) may be designed with two valves and a pipe whereby tramp removal may be effected during operation. The design of such a lock hopper allowing for online removal of heat transfer material from the dead zone may desirably eliminate the need for shutdown during tramp removal. As indicated, such a tramp removal system may also be utilized on the combustor, the CSP, the GSP, or any combination of vessels, whereby materials may be removed therefrom without taking the system(s) offline.

Gasifier Cyclones.

The herein disclosed DFB system may comprise one or more gas/solid separator (e.g., one or more cyclone) on the gasifier outlet. The system may comprise primary and secondary gasifier particulate separators (e.g., primary gasifier cyclone(s) 40 and/or secondary gasifier cyclone(s) 50). In embodiments, the gasifier separators are operable/configured to provide a HTM removal efficiency of at least or about 98, 99, 99.9, or 99.99%. In embodiments, the primary gasifier separators 40 are operable to remove at least or about 99.99% of the heat transfer material from a gas introduced thereto. Higher removal of heat transfer material is generally desirable, as the cost of makeup particulate heat transfer material and the cost of heating same to operating temperature are considerable. The secondary gasifier particulate separator(s) (e.g., cyclones) may be configured to remove at least about 80, 85, 90 or 95% of the char (and/or ash) in the gasifier product gas introduced thereto. In embodiments, secondary gasifier separator(s) 50 are operable to remove at least about 95% of the ash and/or char introduced thereto. There may be some (desirably minimal) amount of recycle ash. The exit from the gasifier to the gasifier primary cyclones may comprise a 90 degree flange.

Syngas Heat Recovery.

The product synthesis gas exiting the gasifier separators may be utilized for heat recovery in certain embodiments. In embodiments, the synthesis gas is not utilized for heat recovery. In embodiments, no heat recovery is incorporated on the syngas and the DFB gasification system further comprises a POx unit, a nickel dual fluidized bed gasifier and/or a boiler downstream of the gasifier separator(s) (i.e. as component(s) of downstream processing apparatus 55/155). It is envisaged that heat recovery apparatus may be positioned between primary and secondary separators. When utilized for heat recovery, the temperature of the synthesis gas may be maintained at a temperature of at least 600° F., at least 650° F., at least 700° F., at least 750° F. or at least 800° F. after heat recovery. For example, maintenance of a temperature of greater than 650° F., 700° F., 750° F., 800° F., 850° F., or 900° F. may be desirable when heat recovery is upstream of tar removal (for example, to prevent condensation of tars). In embodiments, the synthesis gas is maintained at a temperature in the range of from about 650° F. to about 800° F. during heat recovery. In embodiments, the system comprises a steam superheater and optionally there-following a waste heat boiler or waste heat superheater downstream of the gasifier separators for heat recovery from the hot gasification gas comprising syngas, and/or for the production of steam. In embodiments, the system comprises an air preheater for heat recovery from the hot synthesis gas. In embodiments, the system comprises a boiler feedwater (BFW) preheater for heat recovery from the hot synthesis gas. The system may comprise an air preheater, (for example to preheat air for introduction into the combustor, as the introduction of hotter air into the combustor may be desirable). The system may comprise any other suitable apparatus known to those of skill in the art for heat recovery.

Gasifier Seal Pot (GSP) and Combustor Seal Pot (CSP).

As mentioned hereinabove, the seal pot fluidization gas may be or may comprise another gas in addition to or in place of steam. For example, combustor flue gas and/or recycled synthesis gas may be utilized as fluidization gas for the GSP. In embodiments, the fluidization gas for the CSP, the GSP or both comprises steam. When recycled synthesis gas is utilized for fluidization of the GSP, the synthesis gas is returned to the gasifier and may provide additional clean synthesis gas from the DFB system. By using non-steam as the fluidization gas in the seal pot(s), steam may be reduced or substantially eliminated from the product gas, thus increasing the Wobbe Number thereof, which may be beneficial for downstream processes (such as, for example, downstream power production via power production apparatus 140, discussed further hereinbelow). In embodiments, upgrader tailgas (e.g., in product upgrader tailgas line 145C) comprising sulfur is utilized as fluidization gas for the GSP.

Removal of Sulfur Compounds from Product Gasification Synthesis Gas Via Utilization of Wood Ash.

Sulfur may exit the disclosed DFB gasification system with the process gas, the combustor flue gas, and/or with the ash. Removal of the sulfur as a solid may be desired. In embodiments, ash (e.g., wood ash) from the ash removal cyclones is utilized to remove mercaptan sulfur and/or $H_2S$ from synthesis gas. In embodiments, mercaptan sulfur and/or $H_2S$ removal is performed at a pH of greater than or about 7.5, 7.7, or 8. In embodiments, the ash (e.g., wood ash) comprises, for example, NaOH and/or $Ca(OH)_2$. In embodiments, a 'sulfur-grabber' or sulfur extraction material is added with the heat transfer material, such that sulfur may be removed with ash. The sulfur-grabber may comprise a calcium material, such as calcium oxide (CaO), which may be converted to calcium sulfide and exit the system as a solid. In embodiments, ash water (comprising NaOH and/or $Ca(OH)_2$) is utilized to scrub sulfur from the outlet gases. For example, the system may comprise a scrubbing tower for cleaning the process gas. Depending on the basicity of the ash water, it may be utilized, in embodiments, as scrubbing water. Such scrubbing may be performed upstream of an ESP or other particulate separator configured to remove particulates.

The different fluidization gases mentioned for the CSP may be utilized for the GSP as well. (In embodiments, a percentage of air (e.g., less than 4 volume percent) may be utilized on the GSP to provide higher temperature in the gasifier). The fluidization gas on the GSP may be selected from the group consisting of flue gas, steam, recycled synthesis gas, and combinations thereof.

In embodiments, the seal pots are round. In embodiments, the seal pots are rectangular. In embodiments, the seal pots are square. In embodiments, the operating pressure is less than about 15 psig and the seal pots are not round. The use of square and/or rectangular seal pot designs may allow for closer spacing therebetween.

For the GSP, the minimum fluidization velocity for the heat transfer material is set at any point in time. That is, the minimum initial fluidization velocity may be determined by the initial average particle size (e.g., 100, 200, 300 μm). After a time on stream (for example, 120 days), the heat transfer material may have a reduced average particle size; thus the minimum fluidization velocity changes (decreasing with time on stream/HTM size reduction). The CSP and GSP may be selected such that they have a size suitable to handle the highest anticipated fluidization velocity, i.e. generally the start-up value. In embodiments, the minimum fluidization velocity of the GSP is initially high and decreases with time. However, it is possible that, if agglomeration occurs, the minimum fluidization velocity may increase. The minimum fluidization velocity is determined by the heat transfer material, in particular by the average particle size, the density, and/or the void fraction thereof. In embodiments, the minimum fluidization velocity is greater than about 0.2 ft/s. In embodiments, the minimum fluidization velocity is greater than about 1.5 ft/s. As the PSD decreases, seal pot fluidization velocity decreases.

The diameter of the seal pots may be set by the number of dipleg penetrations, i.e. how many cyclones you have and/or by the angles at which the diplegs enter into the seal pot. Primary gasifier particulate separator dipleg(s) 41, secondary gasifier particulate separator dipleg(s) 51, and/or combustor particulate separator dipleg(s) 61 are indicated in FIG. 1. Diplegs may be angled to allow shorter dipleg length. In embodiments, combustor cyclone diplegs enter the top of the gasifier seal pots, as with the CSP (where gasifier cyclone diplegs enter the CSP). The CSP and/or the GSP may contain a distributor (96 and/or 97) configured for distributing gas uniformly across the cross-section (e.g., the diameter) thereof. In embodiments, the distributor is positioned at or near the bottom of the CSP and/or the GSP. In embodiments, to minimize/avoid erosion of the seal leg, the minimum distance between the distributor (i.e. the fluidization nozzles) at the bottom of the seal pot (GSP and/or CSP) and the bottom of the dipleg(s) projecting thereinto is 10, 11, 12, 13, 14, 15, 16, 17 or 18 inches. In embodiments, there is a distance of more than 15, 16, 17 or 18 inches between the seal pot distributor and the cyclone dipleg(s). Desirably, the dipleg-to-dipleg spacing and/or the dipleg-to-refractory ID spacing is at least 10, 11 or 12 inches. In embodiments, the dipleg-to-dipleg spacing and the dipleg-to-refractory ID spacing is at least about 12 inches. In embodiments, the diplegs are supported. Such support may be provided to minimize/prevent vibration of the diplegs. For the GSP, the seal may actually be within the dipleg of the combustor cyclone(s) and the GSP (since gasifier 20 is generally at a higher pressure than combustor separator 60).

The GSP is designed with an adequate head of heat transfer material to minimize backflow. The height of the GSP is based on a design margin. In embodiments, the design margin is in the range of from about 1 psig to about 5 psig, or is greater than or about equal to 1, 2, 3, 4, or 5 psig. The head of heat transfer material (e.g., sand) will provide the ΔP (pressure drop) at least sufficient to prevent backflow of gas/prevent gasifier backflowing into the combustor cyclone. The distribution of nozzles in both the CSP and the GSP may be in the range of from about one to about four nozzles per square foot. In embodiments, the distributors (95, 98, 96, and 97) in any or all vessels (gasifier, combustor, CSP and GSP) comprise from about one to about four nozzles per $ft^2$.

In embodiments, one or more of the seal pots (either or both a combustor seal pot, CSP, and/or a gasifier seal pot, GSP) is replaced with an L valve or a J valve. In embodiments, the disclosed DFB gasification system comprises one or more J valves in place of a CSP. In embodiments, the DFB gasification system comprises one or more J valves in place of a GSP. In embodiments, the DFB gasification system comprises multiple CSPs. In embodiments, the multiple CSPs are substantially identical. In embodiments, the DFB gasification system comprises multiple GSPs. In embodiments, the multiple GSPs are substantially identical. In embodiments, the disclosed gasification system comprises at least one or one CSP and at least one or one GSP. The seal of the CSP may be within the CSP (while the seal on the GSP may simply be within a dipleg). In embodiments, a J valve is utilized on the gasifier rather than a GSP.

The height of the CSP may be determined by the pressure needed for the seal, which is the differential pressure between the gasifier cyclone and the combustor. The combustor pressure plus a design margin may be utilized to determine the desired height of the CSP (i.e. the desired height of the heat transfer material therein). In embodiments, the pressure is near atmospheric. In embodiments, the ΔP is greater than 2 psig. In embodiments, the ΔP is in the range of from about 2 psig to about 25 psig, from about 2 psig to about 20 psig, or from about 2 psig to about 15 psig. In embodiments, the pressure differential is about 10, 12, 15, or 20 psig. Desirably, the ΔP is not less than about 2 psig, as pressure equalization is undesirable. In embodiments, a smaller ΔP is utilized, thus allowing the use of a shorter CSP 70.

The disclosed system and method enable the production of gas by use of a high throughput pyrolyzer and an external combustor, incorporating circulation of a heat transfer material to provide heat for the endothermic gasification reactions. Via the disclosed system and method, exothermic combustion reactions are separated from endothermic gasification reactions. The exothermic combustion reactions take place in or near (for example, when air and/or oxygen is introduced into a combustor seal pot) a combustor, while the endothermic gasification reactions take place in the gasifier/pyrolyzer. This separation of endothermic and exothermic processes may provide a high energy density product gas without the nitrogen dilution present in conventional air-blown gasification systems.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method of gasification, the method comprising:
    producing a gasifier product gas comprising carbon monoxide and hydrogen by introducing a feed material to be subjected to gasification into a dual fluidized bed gasifier comprising a pyrolyzer fluidly connected with a combustor via a combustor seal pot and a pyrolyzer seal pot such that a heat transfer material can be continuously circulated between the pyrolyzer, in which the temperature of the heat transfer material is reduced, and the combustor, in which the temperature of the heat transfer material is increased, wherein a first heat transfer stream comprising heat transfer material is extracted from the pyrolyzer at or near a top thereof, wherein a second heat transfer stream is extracted from the combustor at or near a top thereof, and wherein the feed material is introduced into the pyrolyzer at or near a bottom thereof, wherein the seal pot has a minimum fluidization velocity of greater than about 0.2 ft/s;
    wherein the pyrolyzer is a fluidized bed pyrolyzer operable to convert at least a portion of the feed material into the gasifier product gas, from which the first heat transfer stream is separated prior to introduction of the first heat transfer stream into the combustor, and
    wherein the combustor is a fluidized bed combustor operable to increase the temperature of the heat transfer material via combustion of char introduced thereto with the first heat transfer stream and at least one supplemental fuel in addition to any pyrolysis products extracted from the pyrolyzer via the first heat transfer stream, wherein the at least one supplemental fuel is introduced via a side wall of the combustor;
    producing, downstream of the dual fluidized bed gasifier and from first and second portions of the gasifier product gas, respectively, Fischer-Tropsch hydrocarbons and power, wherein the Fischer-Tropsch hydrocarbons are produced via Fischer-Tropsch synthesis with a Fischer-Tropsch catalyst operable with synthesis gas in a range of molar ratios of hydrogen to carbon monoxide; and
    adjusting the amount of the at least one supplemental fuel to obtain a gasifier product gas having a molar ratio of hydrogen to carbon monoxide in said range.

2. The method of claim 1 wherein the at least one supplemental fuel comprises at least one component selected from the group consisting of methane, Fischer-Tropsch tailgas, PSA tailgas, VSA tailgas, product upgrader tailgas, spent Fischer-Tropsch catalyst, tar, volatile organic compounds (VOC's), animal fats, petroleum oils, synthesis gas, petcoke, biomass, Fischer-Tropsch product, and combinations thereof.

3. The method of claim 2 wherein the at least one supplemental fuel comprises at least one component selected from the group consisting of methane, Fischer-Tropsch tailgas, PSA tailgas, VSA tailgas, product upgrader tailgas, spent Fischer-Tropsch catalyst, tar, volatile organic compounds (VOC's), animal fats, petroleum oils, synthesis gas, Fischer-Tropsch product, and combinations thereof.

4. The method of claim 1 further comprising producing at least one supplemental fuel upstream of the dual fluidized bed gasifier.

5. The method of claim 4 wherein the at least one supplemental fuel comprises a dryer vent gas stream comprising volatile organic compounds (VOC's).

6. The method of claim 5 further comprising scrubbing volatile organic compounds from a dryer vent gas, and utilizing a VOC-reduced dryer vent gas from the scrubber as supplemental fuel.

7. The method of claim 4 further comprising drying at least a portion of the feed material to reduce the moisture content prior to introduction thereof into the pyrolyzer, wherein drying produces a dryer vent gas comprising VOC's, and utilizing at least a portion of the dryer vent gas as supplemental fuel for combustion.

8. The method of claim 7 wherein drying further comprises utilizing at least a portion of the heat from a flue gas produced in the combustor to dry the feed material.

9. The method of claim 1 further comprising producing at least one supplemental fuel downstream from the dual fluidized bed gasifier.

10. The method of claim 9 further comprising subjecting at least a portion of the gasifier product gas to tar removal, and utilizing at least a portion of the removed tar as a supplemental fuel to the combustor.

11. The method of claim 10 wherein subjecting at least a portion of the gasifier product gas to tar removal comprises scrubbing tar from the gasifier product gas with an absorption liquid, to provide a tar-reduced product gas and a spent scrubbing liquid comprising tar, and utilizing at least a portion of the spent scrubbing liquid as supplemental fuel to the combustor.

12. The method of claim 11 further comprising introducing at least a portion of the spent scrubbing liquid to the pyrolyzer to produce additional synthesis gas therefrom.

13. The method of claim 11 wherein the absorption liquid is aqueous or oil-based.

14. The method of claim 1 wherein a Fischer-Tropsch tailgas is formed during the producing of the Fischer-Tropsch hydrocarbons.

15. The method of claim 14 further comprising separating a spent catalyst material comprising Fischer-Tropsch catalyst and Fischer-Tropsch hydrocarbon products, and introducing at least a portion of the spent catalyst material to the dual fluidized bed gasifier.

16. The method of claim 15 comprising utilizing at least a portion of the spent catalyst material as the at least one supplemental fuel for the combustor.

17. The method of claim 15 comprising utilizing at least a portion of the spent catalyst material as feed material for the pyrolyzer.

18. The method of claim 14 further comprising subjecting at least a portion of the Fischer-Tropsch hydrocarbons to product upgrading, wherein product upgrading produces a product upgrading tailgas, and introducing at least a portion of the product upgrading tailgas to the dual fluidized bed gasifier.

19. The method of claim 18 wherein at least a portion of the product upgrading tailgas is introduced as supplemental fuel for the combustor.

20. The method of claim 18 wherein at least a portion of the product upgrading tailgas is introduced as feed material for the pyrolyzer.

21. The method of claim 14 further comprising utilizing at least a portion of the Fischer-Tropsch tailgas as supplemental fuel.

22. The method of claim 14 further comprising utilizing at least a portion of the Fischer-Tropsch tailgas as feed material.

23. The method of claim 14 further comprising utilizing at least a portion of the Fischer-Tropsch tailgas, along with the second portion of the gasifier product gas, for the production of power.

24. The method of claim 1 further comprising reducing the amount of tar in the gasifier product gas by increasing the temperature of the second heat transfer stream introduced into the pyrolyzer by increasing the amount of the at least one supplemental fuel introduced into the combustor.

25. The method of claim 24 comprising no dedicated tar removal step downstream of the dual fluidized bed gasifier and prior to utilization of at least a portion of the gasifier product gas for the production of at least one product selected from the group consisting of power, Fischer-Tropsch hydrocarbons, and non-Fischer-Tropsch chemicals.

26. The method of claim 1 further comprising performing vacuum swing adsorption (VSA), pressure swing adsorption (PSA), or both, thus producing at least one tailgas selected from the group consisting of a VSA tailgas and a PSA tailgas, and introducing at least a portion of the at least one tailgas to the dual fluidized bed gasifier.

27. The method of claim 26 wherein at least a portion of the at least one tailgas is introduced as the at least one supplemental fuel for the combustor.

28. The method of claim 26 wherein at least a portion of the at least one tailgas is introduced as feed material or fluidization gas for the pyrolyzer.

29. The method of claim 1 further comprising producing, downstream of the dual fluidized bed gasifier, non-Fischer-Tropsch chemicals from at least a portion of the gasifier product gas.

30. The method of claim 29 further comprising utilizing at least a portion of a hydrocarbon-containing fluid produced downstream of the dual fluidized bed gasifier as the at least one supplemental fuel for the combustion.

31. The method of claim 1 wherein the at least one supplemental fuel is primarily liquid, primarily solid, or primarily gaseous.

32. The method of claim 31 wherein the at least one supplemental fuel comprises primarily a low pressure gas.

33. The method of claim 31 wherein the at least one supplemental fuel is primarily liquid, and wherein the method further comprises introducing the at least one supplemental fuel into the combustor without directly contacting the refractory thereof with the at least one supplemental fuel prior to combination thereof with the contents of the combustor.

34. The method of claim 1 wherein the second heat transfer stream is introduced into the pyrolyzer at or near a bottom thereof.

35. The method of claim 34 further comprising introducing the feed material into the pyrolyzer at a position substantially across from the introduction of the second heat transfer stream thereto.

36. The method of claim 35 further comprising introducing the feed material into the gasifier via a feed inlet line connected with a side of the pyrolyzer opposite the side via which the second heat transfer stream is introduced.

37. The method of claim 36 wherein the feed inlet line forms an angle with the pyrolyzer wall, wherein the angle is in the range of from about 5 to about 35 degrees.

38. The method of claim 34 wherein the first heat transfer stream is extracted from a side wall of the pyrolyzer at an angle of substantially 90° thereto.

39. The method of claim 34 wherein the first heat transfer stream is introduced into the combustor at or near a bottom thereof.

40. The method of claim 1 wherein the first heat transfer stream is introduced into the combustor at or near a bottom thereof.

41. The method of claim 40 wherein the first heat transfer stream is extracted from a side wall of the pyrolyzer at an angle of substantially 90 degrees thereto.

42. The method of claim 1 comprising adjusting the amount of the at least one supplemental fuel to obtain a gasifier product gas having a molar ratio of hydrogen to carbon monoxide suitable for production of Fischer-Tropsch synthesis products therefrom via an iron-based Fischer-Tropsch catalyst.

43. The method of claim 42 comprising adjusting the amount of the at least one supplemental fuel to obtain a gasifier product gas having a molar ratio of hydrogen to carbon monoxide in the range of from about 0.7 to about 1.7.

44. The method of claim 1 comprising adjusting the amount of the at least one supplemental fuel to obtain a gasifier product gas having a molar ratio of hydrogen to carbon monoxide suitable for production of Fischer-Tropsch synthesis products therefrom via a cobalt-based catalyst.

45. The method of claim 44 comprising adjusting the amount of the at least one supplemental fuel to obtain a gasifier product gas having a molar ratio of hydrogen to carbon monoxide in the range of from about 1.8 to about 2.

46. The method of claim 1 wherein the at least one supplemental fuel is gaseous, and is introduced into the combustor via a combustor distributor configured to distribute combustor fluidization gas thereinto.

47. The method of claim 1 wherein the at least one supplemental fuel is introduced directly into the combustor.

48. The method of claim 1 wherein the at least one supplemental fuel is combined with the first heat transfer stream prior to introduction into the combustor.

49. The method of claim 1 wherein the at least one supplemental fuel is combined with the second heat transfer stream upstream of the pyrolyzer.

50. The method of claim 1 wherein the at least one supplemental fuel is introduced into the combustor in a stream further comprising a make-up amount of the heat transfer material.

51. The method of claim 1 further comprising adjusting the amount of the at least one supplemental fuel to alter the amount of methane in the gasifier product gas.

52. The method of claim 1 further comprising operating the gasifier at a lower pressure during turndown, such that the velocity of the gasifier product gas exiting the pyrolyzer is substantially constant during turndown and production.

53. The method of claim 1 wherein the first heat transfer stream is extracted from a side wall of the pyrolyzer at an angle of substantially 90° thereto.

54. The method of claim 1 wherein the second heat transfer stream is extracted from a side wall of the combustor at an angle of substantially 90° thereto.

55. The method of claim 1 further comprising introducing NaOH into the pyrolyzer.

56. The method of claim 1 further comprising effecting tramp removal during operation via a tramp removal system of the pyrolyzer.

57. The method of claim 1 further comprising introducing the first heat transfer stream that is separated from the gasifier product gas into a fluidized gasifier seal pot prior to introduction thereto into the combustor.

58. The method of claim 1 wherein an outlet of the combustor comprises channels configured for recycle of heat transfer material to the fluidized bed of the combustor.

* * * * *